(12) United States Patent
Liang et al.

(10) Patent No.: US 10,561,988 B2
(45) Date of Patent: *Feb. 18, 2020

(54) METHODS OF PROVIDING INLETS AND OUTLETS TO CELL PAIRS IN WOUND ED DEVICES

(71) Applicant: Evoqua Water Technologies LLC, Warrendale, PA (US)

(72) Inventors: Li-Shiang Liang, Harvard, MA (US); Michael J. Muse, Somerville, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/528,273

(22) PCT Filed: Nov. 23, 2015

(86) PCT No.: PCT/US2015/062143
§ 371 (c)(1),
(2) Date: May 19, 2017

(87) PCT Pub. No.: WO2016/085854
PCT Pub. Date: Jun. 2, 2016

(65) Prior Publication Data
US 2017/0361278 A1    Dec. 21, 2017

Related U.S. Application Data

(60) Provisional application No. 62/084,660, filed on Nov. 26, 2014.

(51) Int. Cl.
*B01D 61/46* (2006.01)
*B01D 63/10* (2006.01)
(Continued)

(52) U.S. Cl.
CPC ............. *B01D 61/46* (2013.01); *B01D 63/10* (2013.01); *C02F 1/4693* (2013.01);
(Continued)

(58) Field of Classification Search
CPC ..... B01D 61/422; B01D 61/48; C02F 1/4693; C02F 1/4695
See application file for complete search history.

(56) References Cited

U.S. PATENT DOCUMENTS 1,425,752 A    8/1922   Davis
5,147,737 A    9/1992   Post et al.
(Continued)

FOREIGN PATENT DOCUMENTS

| CN | 2811266 Y | 8/2006 |
|---|---|---|
| WO | 1986004255 A1 | 7/1986 |
| WO | 2014077887 A1 | 5/2014 |

OTHER PUBLICATIONS

Wen et al, "Spirally Wound Electrodialysis (SpED) Modules," Desalination 101 (1995) 79-91 (Year: 1995).*

*Primary Examiner* — Salil Jain

(57) ABSTRACT

Electrochemical treatment devices for treating water and methods of assembling the devices are provided. Disclosed masking and potting techniques allow separate feeds to be delivered to and/or collected from the depleting compartments and concentrating compartments.

20 Claims, 24 Drawing Sheets

(51) Int. Cl.
   *C02F 1/469* (2006.01)
   *C02F 103/08* (2006.01)
(52) U.S. Cl.
   CPC .... *B01D 2313/105* (2013.01); *B01D 2319/02* (2013.01); *C02F 2103/08* (2013.01)

(56) References Cited

U.S. PATENT DOCUMENTS

| | | | |
|---|---|---|---|
| 5,292,422 | A | 3/1994 | Liang et al. |
| 5,954,937 | A | 9/1999 | Farmer |
| 6,309,532 | B1 | 10/2001 | Tran et al. |
| 7,101,468 | B1 | 9/2006 | Botte |
| 7,195,840 | B2 | 3/2007 | Kaun |
| 7,306,709 | B2 | 12/2007 | Grebenyuk et al. |
| 7,591,933 | B2 | 9/2009 | Grebenyuk et al. |
| 9,782,725 | B2 * | 10/2017 | Liang ............ B01D 61/42 |
| 9,981,865 | B2 * | 5/2018 | Liang ............ B01D 63/10 |
| 2004/0060823 | A1 | 4/2004 | Carson et al. |
| 2007/0215474 | A1 | 9/2007 | Batchelder et al. |
| 2009/0314659 | A1 | 12/2009 | Field |
| 2011/0284376 | A1 | 11/2011 | Ng et al. |
| 2012/0117789 | A1 | 5/2012 | Liang et al. |
| 2016/0236954 | A1 | 8/2016 | Liang |
| 2018/0265380 | A1 * | 9/2018 | Liang ............ B01D 63/10 |

\* cited by examiner

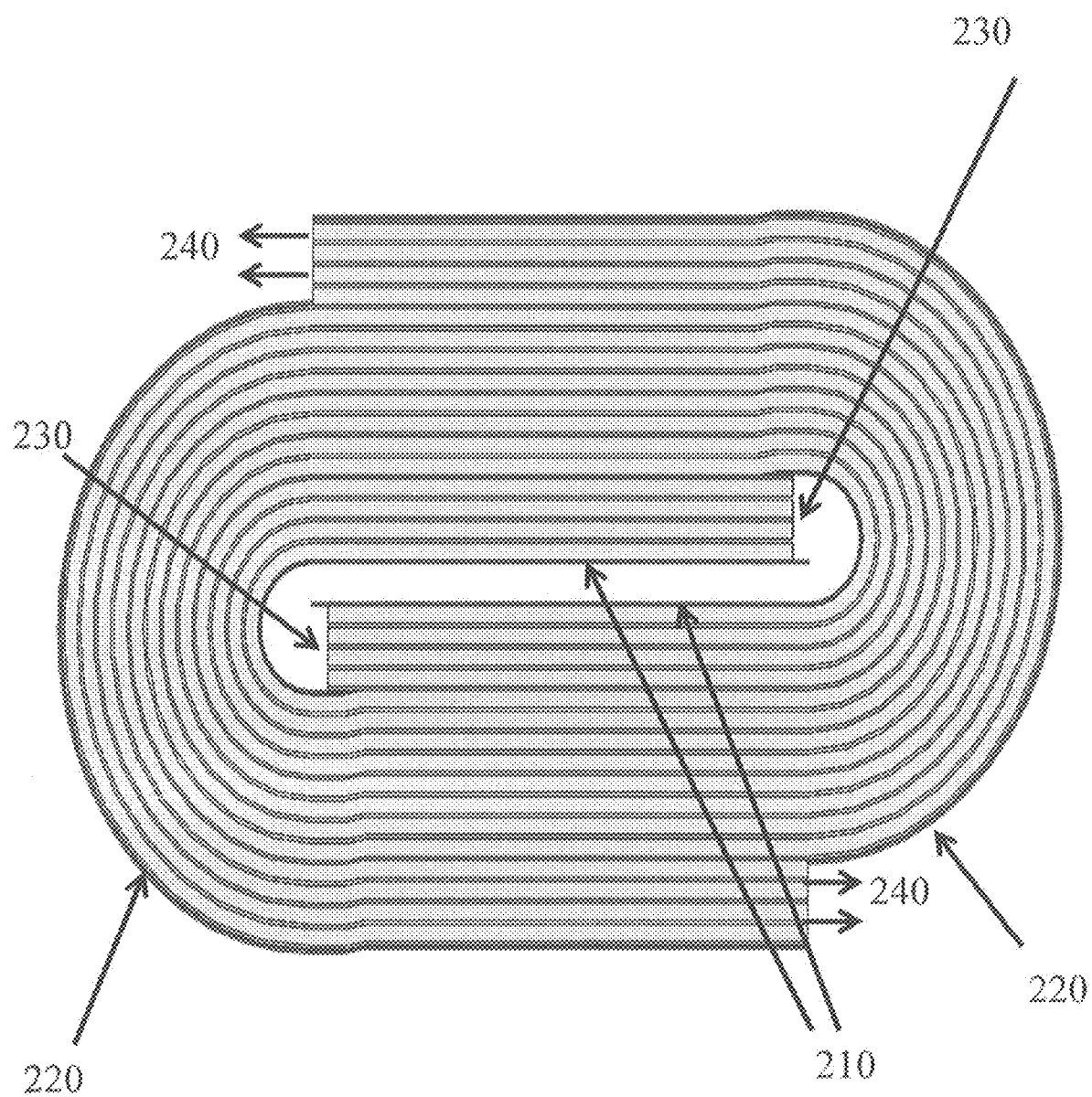
FIG. 2a

METHODS OF PROVIDING INLETS AND OUTLETS TO CELL PAIRS IN WOUND ED DEVICES

CROSS-REFERENCE TO RELATED APPLICATION

This application claims priority to U.S. Provisional Patent Application Ser. No. 62/084,660, titled "METHODS OF PROVIDING INLETS AND OUTLETS TO CELL PAIRS IN WOUND ED DEVICES," filed Nov. 26, 2014, which is hereby incorporated herein by reference in its entirety for all purposes.

FIELD OF THE TECHNOLOGY

One or more aspects relate generally to electrical purification apparatuses and methods of assembling the same.

SUMMARY

In accordance with one or more aspects, an electrochemical separation device is disclosed. The device may comprise a first electrode, a plurality of cell pairs wound around the first electrode to form a bundle, a concentrate stream channel, a dilute stream channel, and a second electrode surrounding the bundle. Each of the plurality of cell pairs comprises an ion concentrating compartment and an adjacent ion diluting compartment. The ion concentrating compartment comprises a first spacer having a masked portion and a potted portion. The adjacent ion diluting compartment may comprise a second spacer having a masked portion and a potted portion. The masked and potted portions of the first and second spacers are in an alternating alignment. The concentrate stream channel extends through the masked portion of first spacer and the potted portion of the second spacer, the concentrate stream channel being in fluid communication with the ion concentrating compartment and in fluid isolation from the ion diluting compartment. The dilute stream channel extends through the potted portion of the first spacer and the masked portion of the second spacer, the dilute stream channel being in fluid isolation from the ion concentrating compartment and in fluid communication with the ion diluting compartment.

In accordance with one or more aspects, the device may further comprise a manifold block proximate to the bundle, the manifold block comprising a dilute stream port in fluid communication with the dilute stream channel. The manifold block may further comprise a concentrate stream port in fluid communication with the concentrate stream channel. The dilute stream port may be in fluid communication with a dilute feed source. The concentrate stream port may be in fluid communication with a concentrate feed source. The dilute feed source may be different from the concentrate feed source. The first electrode may comprise a straight section with a semi-circular section at each end to define a substantially elongated S-shaped anode. A cross-section of the bundle may have a substantially straight section and a curved section at first and second ends of the substantially straight section. Each of the masked portions may comprise a sleeve surrounding a portion of the spacer. The sleeve may comprise a pair of impermeable films joined at a seam. Each of the masked portions may comprise a pair of impermeable films welded to the spacer. The device may further comprise a central hub, the central hub comprising a dilute port in fluid communication with the dilute stream channel and a source of dilute feed. The central hub may further comprise a concentrate port in fluid communication with the concentrate stream channel and a source of concentrate feed. The source of dilute feed and the source of concentrate feed may be different. The bundle may comprise more than 20 cell pairs. The bundle may have a racetrack configuration. The bundle may comprise more than 50 cell pairs. A ratio of a length of the substantially straight section to a radius of each of the curved sections is greater than zero. The radius of curvature of the curved sections may be not dependent on the number of cell pairs.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of multiple embodiments are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIGS. 2a and 2b present schematic cross-sectional and perspective drawings of an electrochemical separation device in accordance with one or more embodiments;

DETAILED DESCRIPTION

Figure 1:
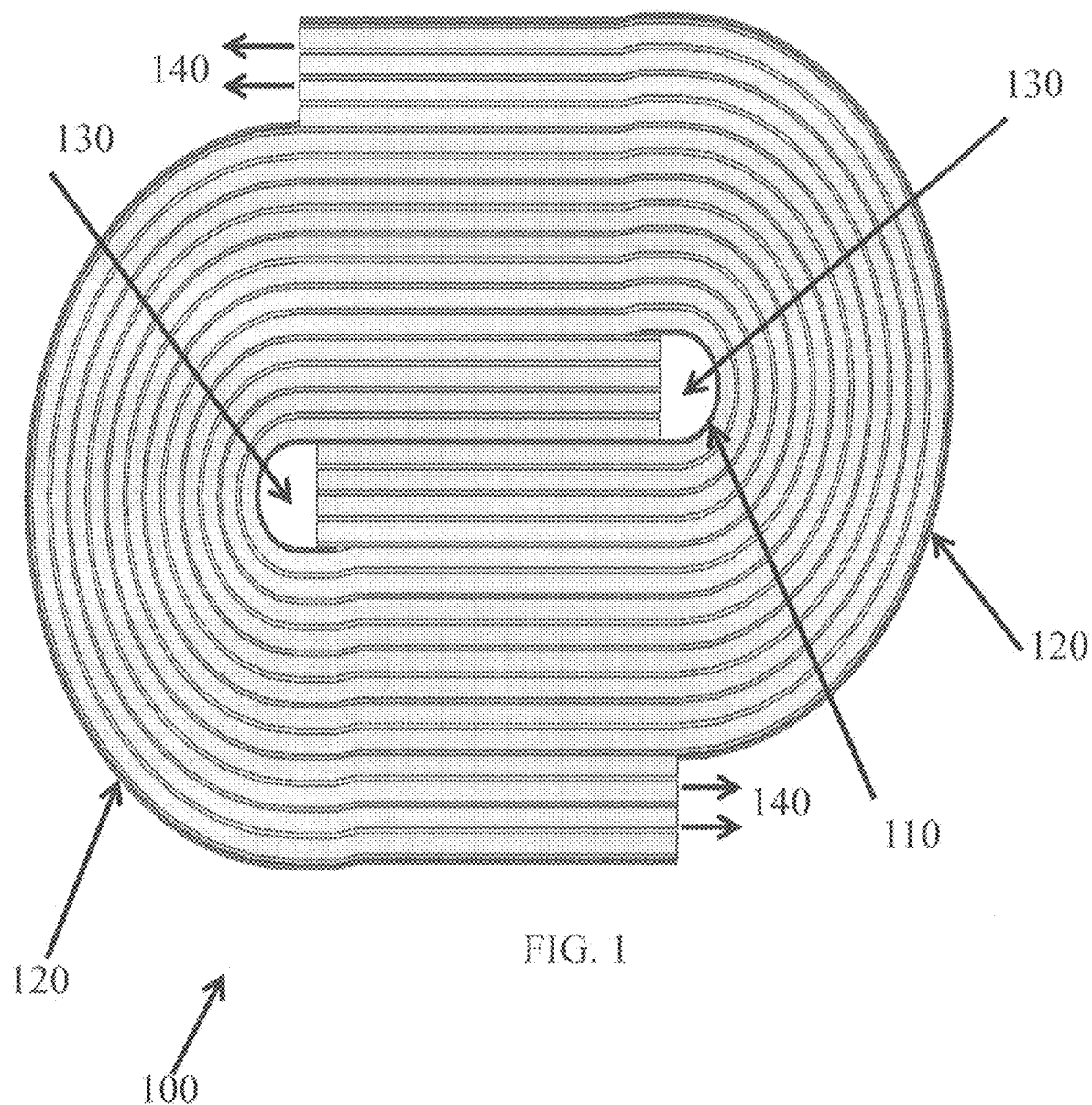
FIG. 1 presents a cross-sectional schematic drawing of an electrochemical separation device in accordance with one or more embodiments.

Electrochemical treatment devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semipermeable or selectively permeable ion exchange or bipolar membranes. Continuous electrodeionization (CEDI) devices are EDI devices known to those skilled in the art that operate in a manner in which water purification can proceed continuously, while ion exchange material is continuously regenerated. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end, and negatively charged species are likewise drawn toward an anode of such devices, typically located at the opposite end. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the anode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half-cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

In plate-and-frame ED designs, the diluting and concentrating streams are in parallel, either co-flow, counter-flow or cross flow. In spiral-wound designs, devices can be constructed with the membranes and screens wound in spirals around an electrode in the center; the other electrode being wrapped around the periphery. The diluting and concentrating streams can flow radially in spiral paths, inward or outward, co-current or counter-current. Alternatively one of the streams can be radial and other in an axial direction. In some configurations, the inner electrode is an anode and the outer electrode a cathode. Feed water, such as seawater, is introduced into the center and fed to the diluting and concentrating compartments. Both streams flow outward in a spiral path towards the cathode. The ends of the spiral bundle are sealed with potting adhesive. The product and reject are collected at the outer ends of the spiral compartments.

Conventional spiral-wound designs may have certain advantages over plate-and-frame designs. Their only leakage current is the current that flows along the spiral paths instead of through the membranes and is expected to be minimal. The assembly of the device has fewer steps and is easier to automate. Components such as spacers in plate-and-frame are not necessary. Spiral-wound designs have certain disadvantages as well including that the current density decreases as the distance from the inner electrode increases, so the rate of ionic transfer from the dilute stream decreases as the diluting stream spirals outward. In order to remove the amount of ions required for an application, the membrane area can be increased by increasing the length of the spirals or the dilute velocity can be decreased, thereby increasing the residence time. Increasing the membrane areas and spiral length increases the cost of membranes and the pressure drop. The additional membrane areas are further away from the inner electrode with even lower current density. Furthermore, since water loss from the dilute compartment to the concentrate compartment is present due to electro-osmosis and osmosis, the flow rate of the final product water is further reduced, so that the energy and capital cost per unit product increase. It is therefore possible to be in a diminishing return scenario in which a cost competitiveness design is not possible. The number of cell pairs, and therefore the product flow rate, is limited by the size of the gaps between the anode segments and the difficulty of winding a large number of sheets. Increasing the radii of the segments, however, increases the cost of the anode, which must be made of expensive oxidation resistant materials such as platinum coated titanium. In order to achieve the salt removal required, the current density at the anode may be unacceptably high, on the order of several hundred amp/$m^2$.

In accordance with one or more embodiments, the efficiency of electrochemical separation systems may be improved. Current loss is one potential source of inefficiency. In some embodiments, the potential for current leakage may be addressed. Current efficiency may be defined as the percentage of current that is effective in moving ions out of the dilute stream into the concentrate stream. Various sources of current inefficiency may exist in an electrochemical separation system. In a cross-flow device, for example, one potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, various techniques and designs may facilitate reduction of current leakage. In accordance with one or more embodiments, a device configuration, such as a racetrack configuration, may provide certain advantages associated with spiral designs while minimizing their disadvantages. Electrochemical treatment devices with cell pairs wound in a racetrack pattern are described in patent application PCT/US2013/032068, filed Mar. 15, 2013 which is incorporated herein by reference in entirety for all purposes.

In accordance with one or more embodiments, an electrochemical separation device may include a configuration to limit or prevent current leakage, such as a racetrack configuration, which occurs when part of the electrical current from one electrode to the other may bypass the stack of cell pairs by flowing through the open areas. In accordance with one or more embodiments, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. In certain embodiments, the obstructions, projections, protrusions flanges, or baffles may be referred to as a flow redistributor. A flow redistributor may be present in one or more of the compartments of the cell stack.

Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus. Advantages of achieving greater membrane utilization may include lower energy consumption, smaller footprint of the apparatus, fewer passes through the apparatus, and higher quality product water. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of any spacer. In order to obtain predetermined membrane utilization, appropriate securing techniques and components may be selected in order to achieve a reliable and secure seal that allows optimal operation of the electrical purification apparatus, without encountering leakage within the apparatus. In some embodiments, stack production processes may involve thermal bonding techniques to maximize membrane utilization, while maintaining a large surface area of membrane that may be used in the process.

The electrical purification apparatus of the present disclosure may further comprise a housing that encloses the cell pairs. In accordance with one or more embodiments, the housing may include electrodes. One or both of the electrodes may be segmented as discussed herein. A frame or support structure may be positioned between the housing and the cell pairs to provide additional support to the cell pairs. The frame or support structure may also comprise inlet manifolds and outlet manifolds that may allow the flow of liquid in and out of the cell pairs. The frame or support structure, together with the cell pairs, may provide an electrical purification apparatus modular unit. The electrical purification apparatus may further comprise additional modular units secured within the housing.

This invention is not limited in use to electrodialysis equipment. Other electrochemical deionization devices such as reverse electrodialysis (RED), electrodeionization (EDI) or continuous electrodeionization (CEDI) may also be constructed using a similar configuration. Potential applications include, for example, desalination of seawater, and treatment of brackish water and brines from oil and gas production.

In accordance with one or more embodiments, an electrochemical separation device is provided. As noted, in some embodiments, the electrochemical separation device may be an electrodialysis device. According to certain embodiments, the electrochemical separation device may comprise an electrode and at least one cell pair. The cell pair may comprise a diluting compartment and a concentrating compartment, each formed by a surrounding anion and cation exchange membrane. In at least some embodiments, the cell pairs may be wound around the electrode to form a bundle. A bundle may consist of one or more sets of cell pairs wound around the electrode. The wound bundle may have a racetrack configuration. In various embodiments, the electrochemical separation device may further comprise a second electrode that is configured to surround the bundle wound in a racetrack configuration. One or both of the electrodes may be segmented to accommodate the bundle configuration. In certain embodiments, the electrochemical separation device may further comprise a manifold for facilitating fluid flow through the at least one cell pair of the bundle.

In accordance with one or more embodiments, a racetrack configuration may combine the advantages of plate-and-frame and spiral-wound ED devices. As shown, in the membrane area bound by the substantially horizontal or straight side sections of the anode and cathode segments, the membranes are planar and parallel, as in plate-and-frame and cross-flow devices. The current density is substantially uniform and the rate of ionic removal from the diluting compartments is not a function of the distance from the inner electrode. The only membrane area not active in ionic transfer is a small fraction encapsulated in a potting compound. Membrane utilization of over 85% may be achieved, as in cross-flow and spiral-wound devices. The minimal current leakage is the current that flows along the racetrack paths instead of through the membranes. As a result, high current efficiency may be achieved. In some embodiments current efficiency of at least about 60% may be achieved; in other embodiments, a current efficiency of at least about 70% may be achieved. In still other embodiments, potential current efficiency of greater than 80% may be achieved; in some instances current efficiency of as much as 85% may be achieved. In some embodiments, a current efficiency of up to 95% may be achieved. Another advantage of the present configuration is that assembly of the device is relatively simple, involving fewer steps than in conventional plate-and-frame device assembly and may be, therefore, easier to automate.

In accordance with one or more embodiments, the device having a racetrack configuration may involve numerous variables for optimization, including number of cell pairs, length of the substantially straight side sections in the inner electrode, number of windings around the inner electrode and length of flow paths, flow velocity at the inlet to the dilute and concentrate compartments and inter-membrane spacing, and type of screens in the diluting and concentrating compartments, which may be the same or different. The membrane area in the curved side portions of the racetrack paths are subject to the non-uniform current density as in spiral-wound devices. In these curved portions of the device configuration, a diminishing rate of ionic removal with distance from the inner electrode may be observed in operation; as a result, there may be a diminishing return in cost competitiveness with increased number of windings.

FIG. 1 is a schematic cross-sectional drawing of an electrochemical separation module 100 with a racetrack configuration that features a unitary anode 110 and a segmented cathode 120. Two stacks of cell pairs comprising anion and cation exchange membranes may be wound around anode 110 to form a bundle. The cathode 120 may be segmented into two sections that surround the bundle. Alternatively, the cathode may be a continuous structure. Feed water, such as seawater, may be introduced into inlets 130 shown positioned near the center of the module near anode 110. The water may be fed to the diluting and concentrating compartments of the module through inlets 130. As the water is treated as it proceeds to flow outward toward cathode 120. After the feed water has been treated in the diluting and concentrating compartments, the corresponding product and reject flows are collected at the outer ends of the module and exit through outlets 140. In some embodiments, the module may be configured so that the diluting and concentrating streams flow co-currently with each other in a substantially wound flow path from the anode to the cathode. In the alternative, the module may be configured so that the diluting and concentrating streams flow counter-current to each other. In another embodiment, the module may be configured so that one of the diluting and concentrating streams flows in a substantially wound flow path from the anode to the cathode, while the other of the diluting or concentrating streams flows in a substantially axial direction perpendicular to the other stream. This particular configuration may be suitable in applications where the conductivity of the feed water is low. In yet other embodiments, the module may be configured so that the diluting and concentrating streams flow inward from the outer cathode to the inner anode. Although described as having an outer cathode and inner anode, it is appreciated that alternative arrangements may include an inner cathode and an outer anode.

For clarity, it is noted that in FIG. 1 the thickness of the components are exaggerated and only two cell pairs per stack are shown, with the cell pairs wound around the anode two times. In practice, there may be additional cell pairs, and associated windings.

In some non-limiting embodiments, the anode 110 may be fabricated by taking a flat plate and then bending or rolling the ends. In the alternative, the anode may be constructed by welding sections of flat plate to sections shaped like half-cylinders. The substrate of the anode may be manufactured from various materials such as titanium and may be further coated on the surface with an oxidation-resistant material such as platinum, iridium oxide, ruthenium oxide, tin, and mixtures thereof. For example, an anode may be formed from titanium coated with an iridium and tin. The cathode may be formed from various materials such as 316 stainless steel. According to some embodiments, the membranes may be homogeneous in construction and be 0.025 mm thick, and the screens may be 0.25 mm thick, yielding a cell pair with a thickness of 0.55 mm. These dimensions would allow a stack of 50 cell pairs to subsequently be able to fit into an end section with a radius of 13.8 mm Ion exchange membranes may be selected from conventional materials used in electrochemical treatment devices, such as in conventional ED and EDI devices described herein. In some embodiments, ion exchange membranes, for example, may be membranes described in U.S. Pat. No. 8,703,831, issued on Apr. 22, 2014, and U.S. Pat. No. 9,023,902, issued on May 5, 2015, both of which are assigned to Evoqua Water Technologies Pte. Ltd., and the contents of which are incorporated herein by reference. In some embodiments, cation exchange membranes may comprise a microporous membrane support and a crosslinked cation transferring polymer filling the microporous membrane support, and comprising the polymerization product of one or more ionogenic monomers, a neutral monomer, and a multifunctional monomer. Such cation exchange membranes may have pores of between about 0.05 micron to about 10 microns. The porous membrane substrate may be less than about 155 microns thick. In some embodiments, the porous membrane substrate may be less than about 55 microns thick. In some embodiments, the cation exchange membranes may have a porosity of greater than about 45%. The cation exchange membranes may have a permselectivity of greater than about 95%, and a resistivity of not greater than about 1.0 ohm-cm$^2$.

In some embodiments, anion exchange membranes may comprise a microporous membrane support and a crosslinked anion transferring polymer filling the microporous membrane support, and comprising the polymerization product of one or more ionogenic monomers, a neutral monomer, and a multifunctional crosslinking monomer. Such anion exchange membranes may have pores of between about 0.05 micron to about 10 microns. The porous membrane substrate may be less than about 155 microns thick. In some embodiments, the porous membrane substrate may be less than about 55 microns thick. In some embodiments, the anion exchange membranes may have a porosity of greater than about 45%. The anion exchange membranes may have a permselectivity of greater than about 94%, and a resistivity of not greater than about 1.0 ohm-cm$^2$.

Figure 2B:
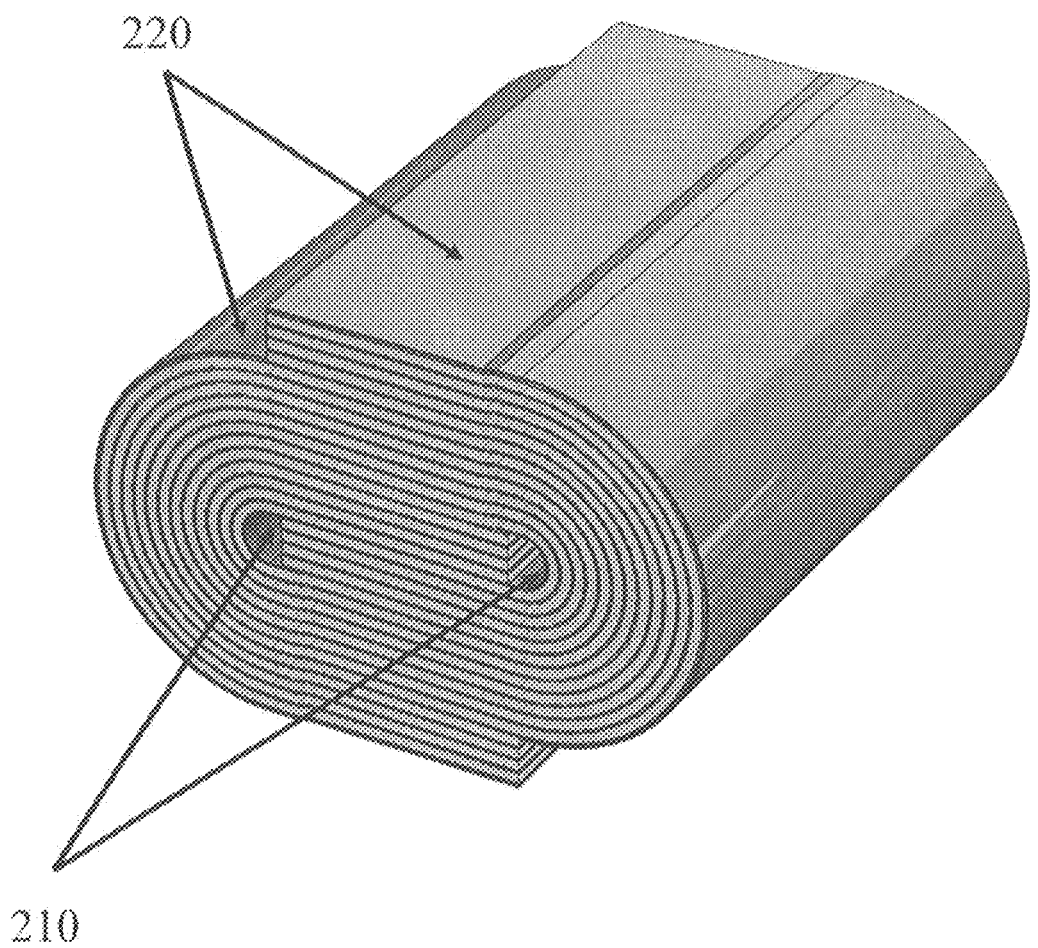

FIG. 2a is a schematic cross-sectional drawing of an electrochemical separation module 200 with a racetrack configuration that features a segmented anode 210 and a segmented cathode 220. The anode may be segmented in two sections, and two stacks of cell pairs comprising anion and cation exchange membranes are wound around the sections of the segmented anode 210 to form a bundle. In a similar fashion as the arrangement shown and described in FIG. 1, feed water may be introduced into inlets 230 shown positioned near the center of the module near anode 210. The water may then proceed to flow outward toward cathode 220, and exit the module through product and reject outlets 240. FIG. 2b is a perspective view of the alternatively configured module shown in FIG. 1. The segmented anode may allow for more flexibility in the construction of the module. For example, the radii of the curved sections of the anode and the curved sections of the bundle can be independent of the number of cell pairs, because the distance between the straight sections of the segmented anode may be varied.

Figure 3:
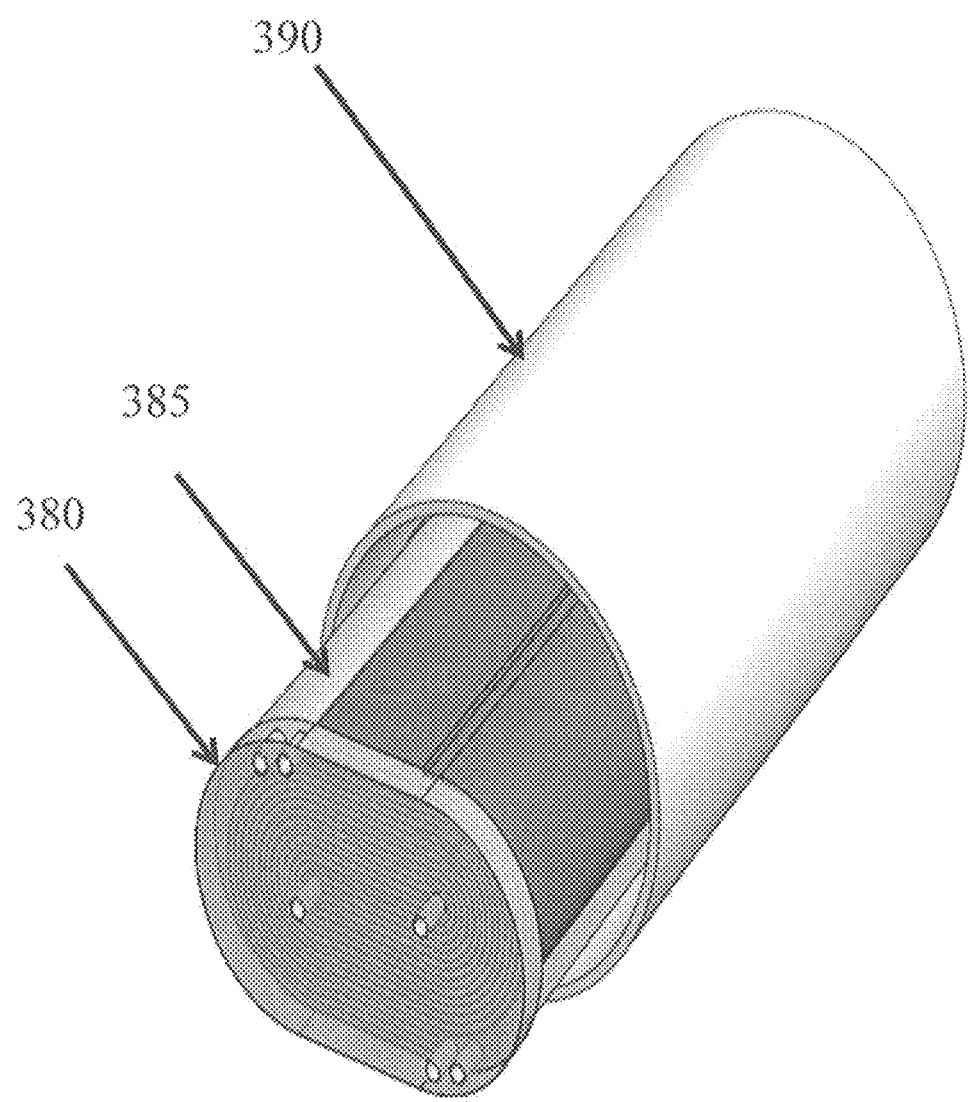
FIG. 3 presents a schematic drawing of an electrochemical separation device housed in a vessel in accordance with one or more embodiments.

FIG. 3 is a schematic drawing of a racetrack configured electrochemical separation module having a wound bundle to be positioned in a vessel. A module have such a racetrack configuration may be supported in a vessel of various configurations. In accordance with one or more non-limiting embodiments, after the one or more cell pairs are wound around an inner electrode, one or both of the ends of the bundle are sealed in a potting adhesive 380, which may be cured and trimmed as desired or necessary to position it into a housing or vessel. The potted bundle may then be inserted into a vessel, such as a cylindrical vessel 390. The vessel may further comprise one or more endblocks (not shown), sealing, support, and fluid and electrical communication to the bundle. One or more outlet manifolds 385 may comprise outlets for the product and reject streams. Inlet manifolds may also be in fluid communication with the bundle. Any gaps or openings between the bundle and the vessel interior portion may be further filled with contoured parts or materials (not shown) such that the vessel 390 functions to support the outer periphery of the bundle. As noted, vessel 390 may be secured and closed by one or more endblocks (not shown) that may further provide communication to the inlet and outlet ports and electrical connections to the electrodes. If contoured parts or materials are used to secure the bundle of cell pairs within the housing or vessel, they may be fabricated from low-cost, non-reactive, and non-corrosive materials such as plastic materials formed by molding or machine processing techniques. The contoured parts or materials may also function to support the bundle of cell pairs, or perform other functions. For example, one or more of the contoured parts or materials may contain one or more manifolds for collecting the effluent from the reject or product streams and routing it to a corresponding port. In certain embodiments, the contoured parts or filler materials may not be necessary for operation of the module. For example, the potted bundle may be inserted into a vessel and endblocks may be attached. Filler materials may then be injected into the cavity between the bundle and the interior surface of the vessel. Examples of suitable filler materials include rigid or semi-rigid potting compounds and sealant foams, which may expand and solidify after being injected into the cavity. The vessel 390 may be constructed in any common or irregular shape. Certain vessel configurations may enable multiple devices to be positioned into the vessel. The vessel may be any shape that is suitable for performing as a housing for the bundle configurations described.

As shown and described, in some embodiments, a cross-section of the bundle formed from the wound anion and cation exchange membranes and the anode may have a substantially horizontal or straight side sections and curved sections at first and second ends of the substantially straight sections. In certain embodiments, the current density may be substantially uniform throughout the substantially straight sections of the bundle. In addition, the rate of ionic removal from the diluting compartments is not a function of the distance from the inner electrode. These are distinct advantages over spiral-wound devices, since current density may decrease as the distance from the inner electrode increases in this type of configuration. This means that the ionic transfer rate from the dilute stream decreases as the diluting stream spirals outward. To achieve a desired level of ion removal, the current density at the inner electrode may be unacceptably high (on the order of several hundred amp/m$^2$). In addition, the membrane area may have to be increased by increasing the length of the spirals or by decreasing the flow rate through the dilution compartment. Both of these approaches require that the residence time be increased and may contribute to an increase in pressure drop across the device. In addition, increasing the membrane areas and spiral length may increase the cost of both manufacturing and operating the membranes. Furthermore, water loss associated with electro-osmosis and osmosis may contribute to a reduced flow rate of the product stream. Spiral-wound devices may also be disadvantaged by the fact that the number of cell pairs, and therefore the flow rate of the product exiting the device, may be limited by the size of the gaps between the anode segments and the difficulty in winding a large number of cell pairs around the central electrode. Increasing the radius of the segmented inner electrode in a spiral-wound device may increase the cost of the electrode, and this additional cost may be significant. Use of the racetrack configuration may minimize one or more of these disadvantages associated with the spiral-wound device.

The curved sections generally exhibit non-uniform current density that may vary with the radius of the curve. The present configuration, therefore, may become more efficient as they include a substantially straight section. The uniform current density exhibited throughout the substantially straight section may reduce the effect of non-uniform current density in the curved sections. In various embodiments, therefore, a ratio of the length of the substantially straight section to a radius of the curved sections is greater than zero. The ratio may become greater as the substantially straight section increases in length; alternatively, the ratio may be reduced, and approaches zero, as the substantially straight section decreases in length (the ratio is zero if the bundle has no substantially straight section as in a spherical configuration). In at least one embodiment, the radius of curvature of the curved sections may not be dependent on the number of cell pairs. According to some embodiments, the radius of each of the curved sections is equal to about the thickness of a stack of cell pairs. In various aspects, the anion and cation exchange membranes are planar and parallel along the substantially straight section of the bundle. In some embodiments, the bundle may have two axes of symmetry. In yet another embodiment, the curved sections may be other than semi-circular, such as an elliptical or other curved shape.

In various embodiments, one or more of the electrochemical separation devices may be used in a water treatment system. The water treatment system may further comprise other components and devices, such as sensor and control devices, additional manifold and distribution assemblies, storage devices, and additional treatment devices. In some aspects, one or more of the electrochemical separation devices may be incorporated into a pre-existing water treatment system. Non-limiting examples of suitable sources of water to be treated include sources of potable water, for example, municipal water or well water, sources of non-potable water, for example, brackish or salt-water, pre-treated semi-pure water, and any combination thereof.

Figure 4:
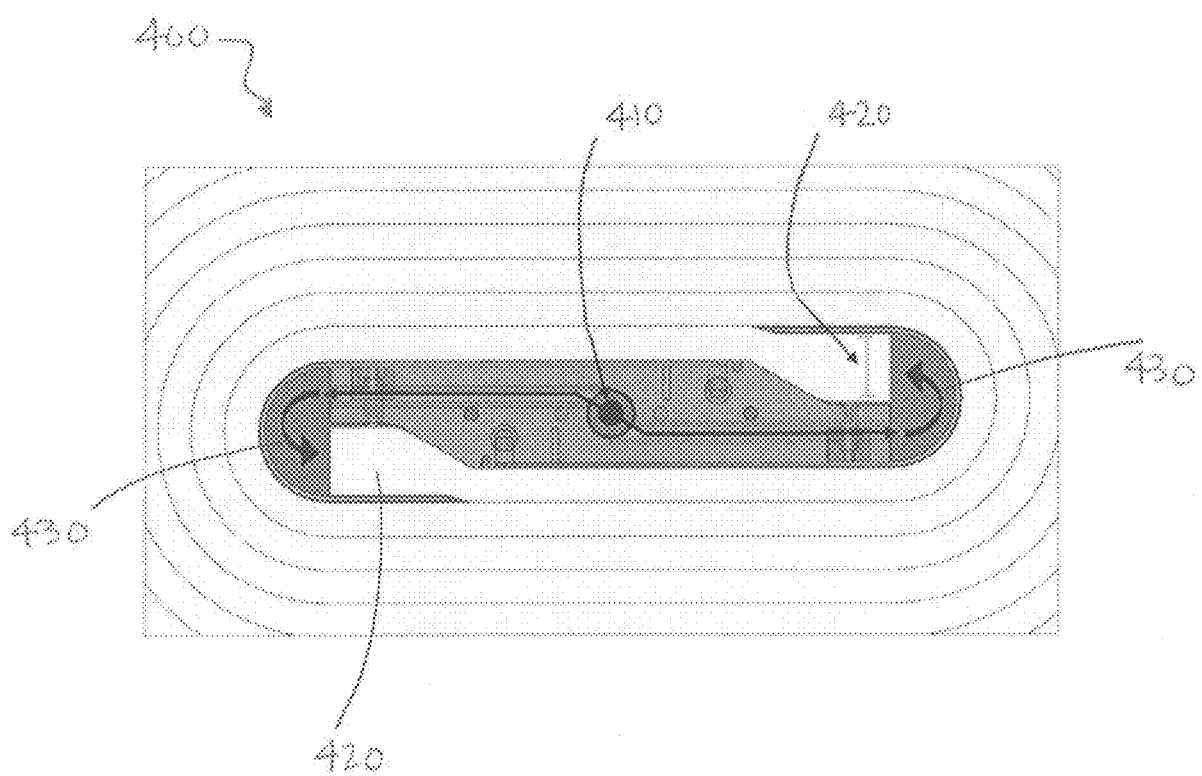
FIG. 4 presents a schematic drawing of a flow pattern from a central hub to inlets of wound cell pairs of an electrochemical separation device in accordance with one or more embodiments.

One or more embodiments of methods and systems for delivering feed to the inlets of a device may require a common feed to supply compartments and cell pairs. As a result the same water source supplies the dilute compartments as well as the concentrate compartments. Such systems may, therefore, limit the ability to incorporate the module into a water treatment system. The versatility of such systems is limited particularly with regard to controlling energy consumption and product water quality. FIG. 4 is a schematic view of an example flow pattern through an electrochemical separation device 400 in which a central inlet hub 410 supplies the same feed water to all compartments of wound cell pairs 420 as shown by the flow direction arrows 430.

Figure 5:
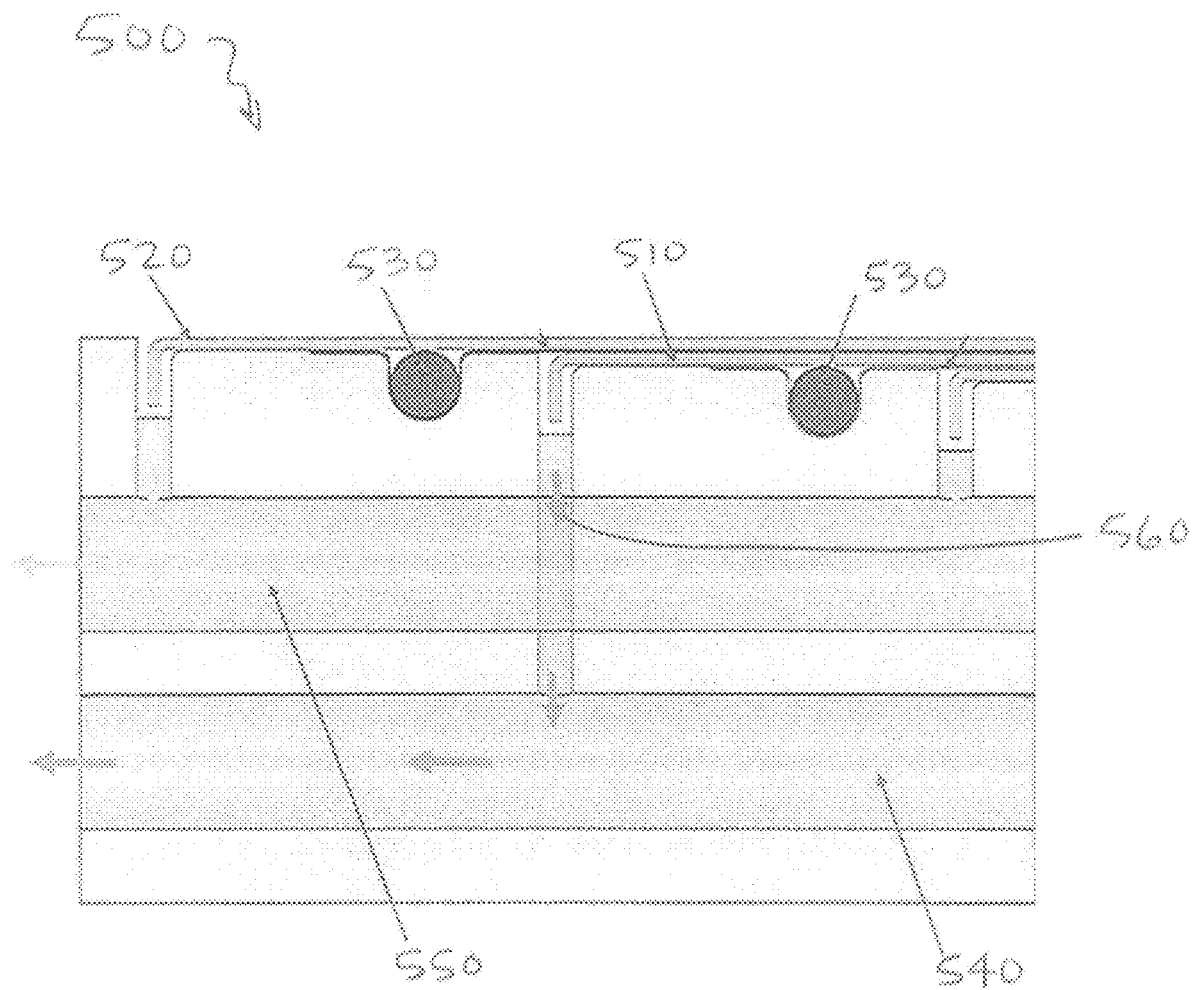
FIG. 5 presents a schematic drawing of various flow patterns from outlets of wound cell pairs to collection manifolds in accordance with one or more embodiments.

In addition, one or more embodiments of a system for collecting product and reject streams from the outlets of wound cell pairs in electrochemical treatment devices may limit the number of cell pairs that may be implemented in a given device and area. These methods and systems may require the use of a manifold with the membranes separating the dilute and concentrate compartments sealed to the block using mechanical seals, such as O-rings. In one such embodiment, a manifold 500 is shown in FIG. 5, product flow stream 560 exiting each of the dilute compartments 510 is collected in a first manifold 540, the product collection manifold, and directed out of the electrochemical treatment device. Similarly, reject flow stream 570 exiting the concentrate compartments 520 is collected in a second manifold 550, the reject collection manifold.

As shown in FIG. 5, spacers of the dilute compartment 510 and concentrate compartment 520 are spaced apart for O-ring seals 530 to be positioned between the components. For example, with a spacing of about 10 mm, a cell pair would require a distance of 20 mm Each manifold in a device comprising, for example, five cell pairs would therefore be at least 100 mm in length. A commercial electrochemical device having such a configuration may require 20-50 cell pairs per bundle, based on current process and economic models. The manifold systems and methods may therefore be large and potentially difficult to implement.

According to one or more embodiments, alternatives to the feed and manifold systems are disclosed. According to one or more embodiments, systems that may accommodate a larger number of cell pairs per bundle in a compact space are provided.

According to one or more embodiments, methods and systems for supplying separate feed streams to dilute and concentrate compartments in electrochemical treatment devices, and collecting separate product and reject streams from the same are disclosed. The method of constructing such a system may comprise selectively embedding components in sealing materials and drilling strategic passages thereafter to provide communication between an inlet or outlet port with the dilute or concentrate compartments.

Figure 6:
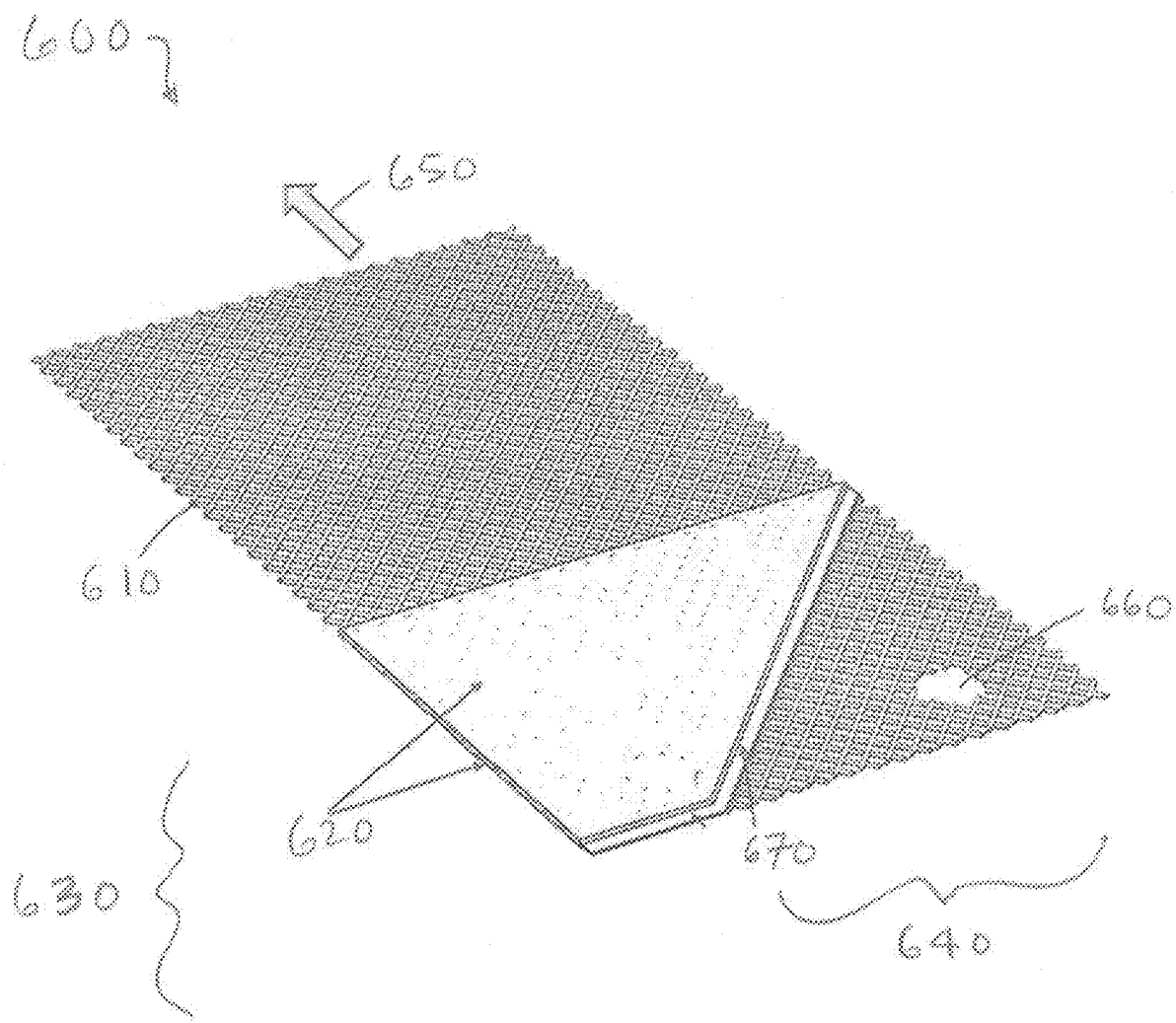
FIG. 6 presents a schematic drawing of a masked spacer screen in accordance with one or more embodiments.

According to one or more embodiments, the method of making the system components may comprise a series of steps described herein with reference to the figures. As shown in FIG. 6, a flow compartment 600 may include a spacer screen. An impermeable film 620, shown in two pieces, may form a seam 670 by being bonded or welded with spacer screen 610 in between to form a masked portion 630 of spacer screen 610. The welded film 620 will, during a subsequent potting step, prevent epoxy from filling masked portion 630 of spacer screen 610. An adjacent portion 640 of spacer screen 610 that has not been masked may be filled with epoxy and become a potted portion. In the embodiment shown in FIG. 6, spacer screen 610 is pre-punched with holes 660 that match the location and diameter of the flow channels.

The section of spacer screen 610 shown serves as the beginning of the spiral path (inlet to the compartment) as shown by the flow direction arrow 650. It is also appreciated that alternative arrangements may include a flow in the opposite direction. This section of the compartment may also serve as an outlet, as similar disclosed methods may be used to facilitate the segregation of fluid streams both at the inlet and at the outlet of a bundle of cell pairs. Likewise, spacer screen 610 may be part of either a dilute compartment or a concentrate compartment, as similar techniques are applied.

The step of bonding or welding films 620 together may be accomplished through any known methods. For example, films 620 may be thermally welded by an impulse heater, which utilizes a heated band, or an ultrasonic welder. According to certain embodiments, both the films and the screen are melted together to form seams that are impermeable to the sealing material to be introduced at a later step. Preferably the material and thickness of the spacer screen and the films allow the welding to be accomplished in one operation. Alternatively, the weld areas on the screen may be preheated and compressed to collapse the spacer screen strands. The films may then be positioned on both sides of the screen while heat may be applied to penetrate through all three components and form seams.

Potential materials for the films include materials which are weldable and have low permeability. Examples of such materials include, without limitation, polyvinylchloride (PVC) and polyester.

Figure 7:
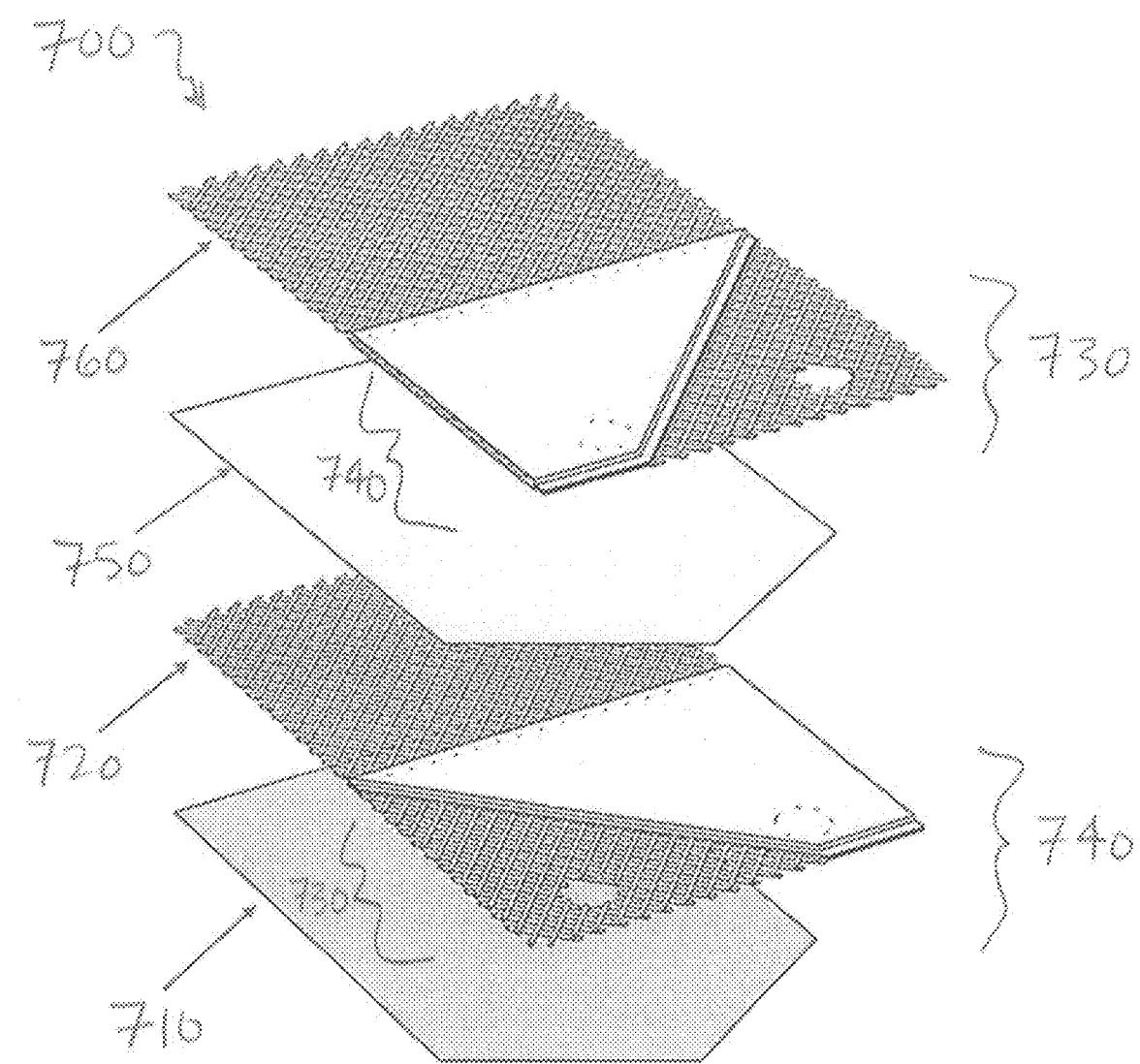
FIG. 7 presents an exploded view schematic drawing of a cell pair in accordance with one or more embodiments.

FIG. 7 provides an exploded view of a cell pair 700 in which the welding operations described with regard to FIG. 6 may be used with concentrate spacer screen 720 and dilute spacer screen 760. The masked portions 740 of dilute spacer screen 760 and concentrate spacer screen 720 are mirror images about the longitudinal centerlines of the spacer screens, placing the masked portions 740 and the to-be-potted portions 730 of the screens in an alternating alignment. Anion exchange membrane 750 and cation exchange membrane 710 that complete the cell pair 700 are also shown in FIG. 7.

According to one or more embodiments, a plurality of cell pairs that comprise a bundle are stacked and sandwiched between two blocks, at least one of which has internal passages connected to ports. In the exemplary system 800 shown in an exploded view in FIG. 8, the bundle of cell pairs 810 is placed between a top block 820 and a bottom block 830. The bottom block 830 includes flow passages 840 and 845 which, in operation, will allow for fluid communication between one or more feed sources and the dilute compartments and concentrate compartments, respectively.

Figure 8:
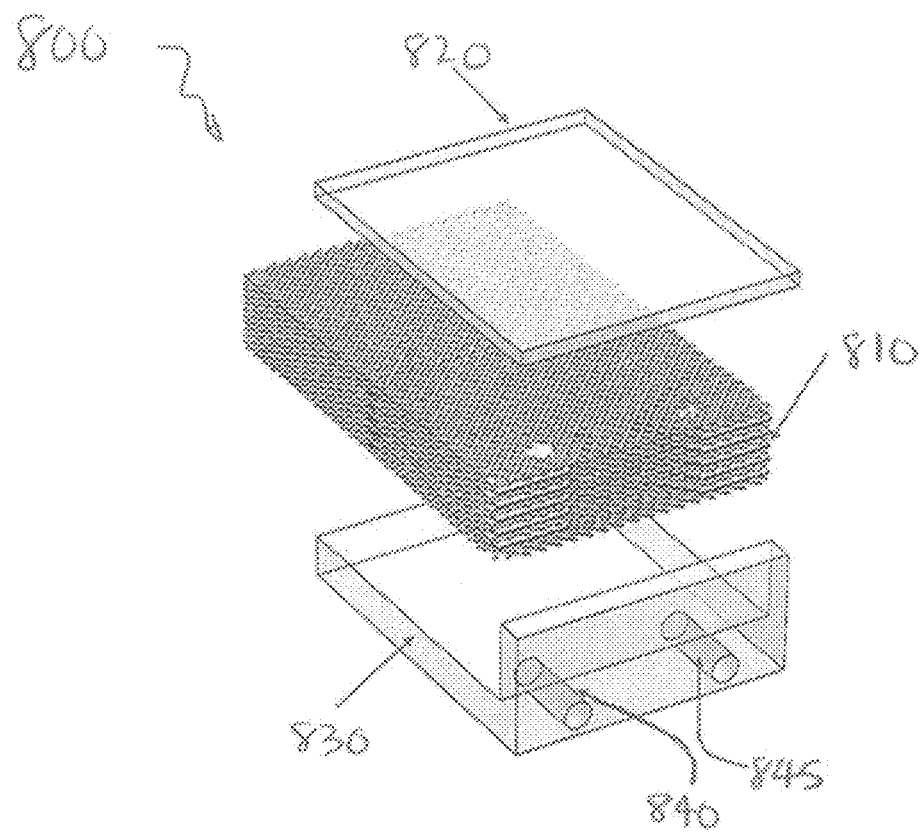
FIG. 8 presents an exploded view schematic drawing of a bundle of cell pairs placed within a pair of blocks in accordance with one or more embodiments.
Figure 9:
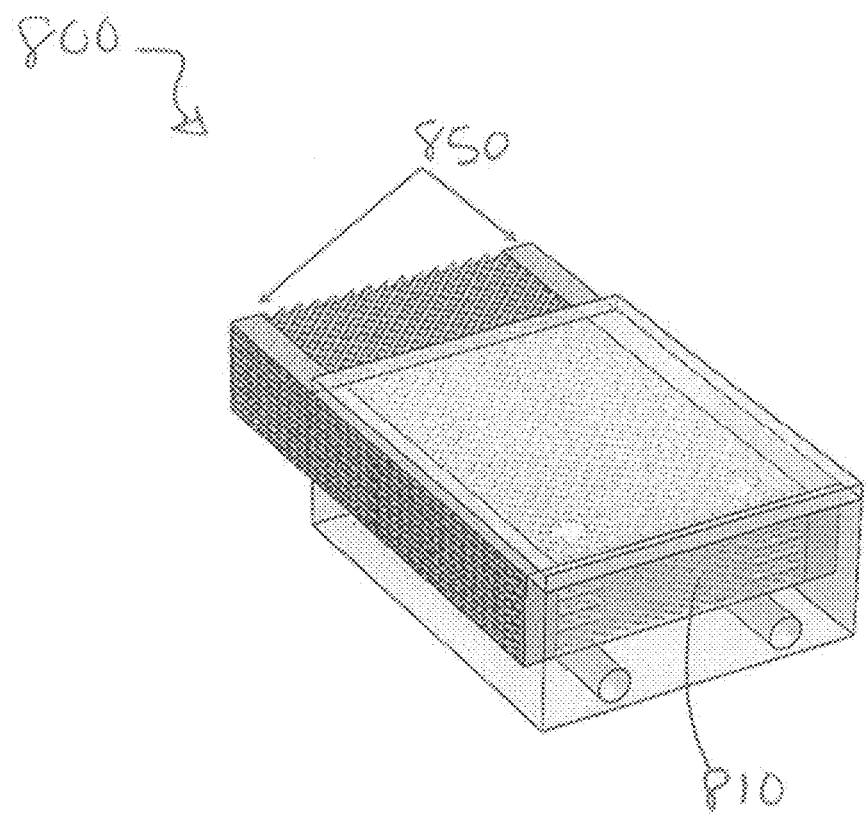
FIG. 9 presents a schematic drawing of a bundle of cell pairs placed within a pair of blocks in accordance with one or more embodiments.
Figure 10:
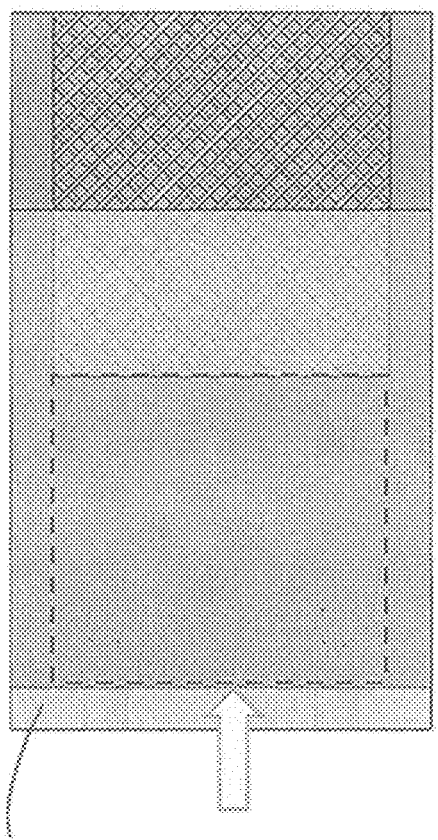
FIG. 10 presents a schematic drawing of a bundle of potted cell pairs in accordance with one or more embodiments.

As shown in FIGS. 8 and 9, edges 850 of system 800 are potted with adhesives along with the edges of the bundle of cell pairs 810 in the electrochemical separation device. The end portions 860 of the spacer screens covered by the films may be potted with the same adhesive, as shown in FIG. 10.

Figure 11:
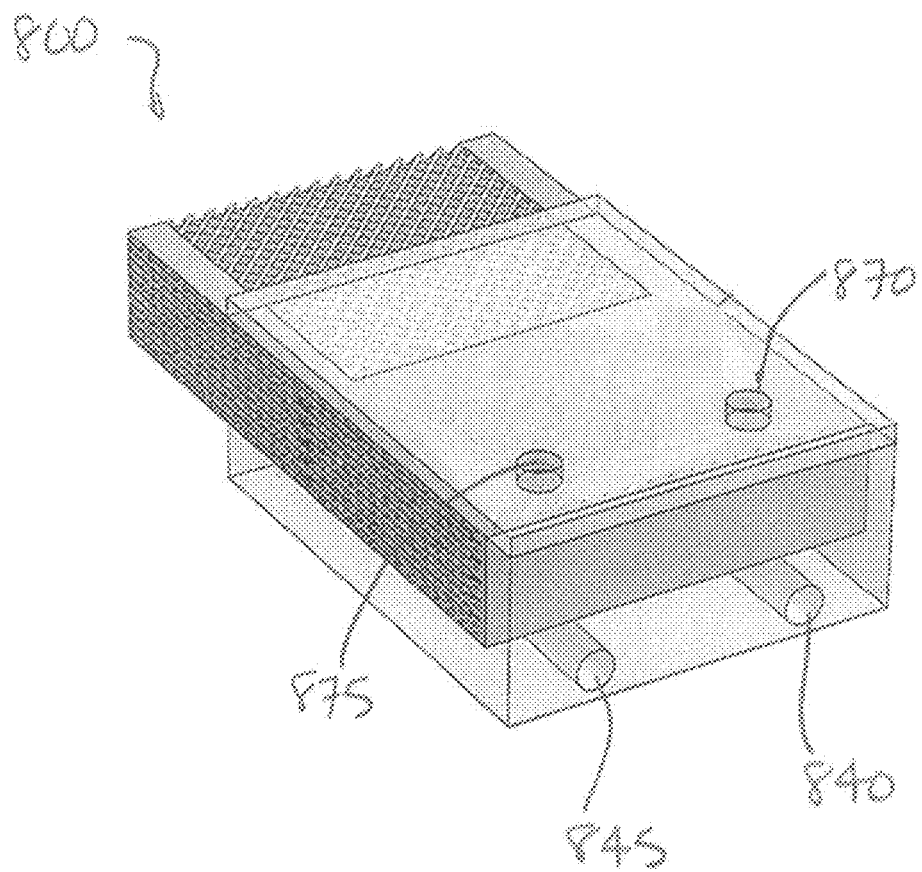
FIG. 11 presents a schematic drawing of a portion of a bundle of cell pairs placed within a pair of blocks in accordance with one or more embodiments.

After the adhesive has set and cured, channels 870 and 875 are formed by drilling through top block 820 and through the potted end portion 860 of cell pairs 810 into bottom block 830 until channels 870 and 875 intersect internal flow passages 840 and 845, respectively, as shown in FIG. 11. Dilute channel 870 passes through the masked portions of the dilute compartments and allows the dilute compartments to communicate with dilute port 840. Likewise, the concentrate channel 875 passes through the masked portions of the concentrate compartments and allows the concentrate compartments to communicate with concentrate port 845. The holes in top block 820 may be sealed using plugs, adhesive, threaded plugs, or some combinations of these or other means.

Figure 12:
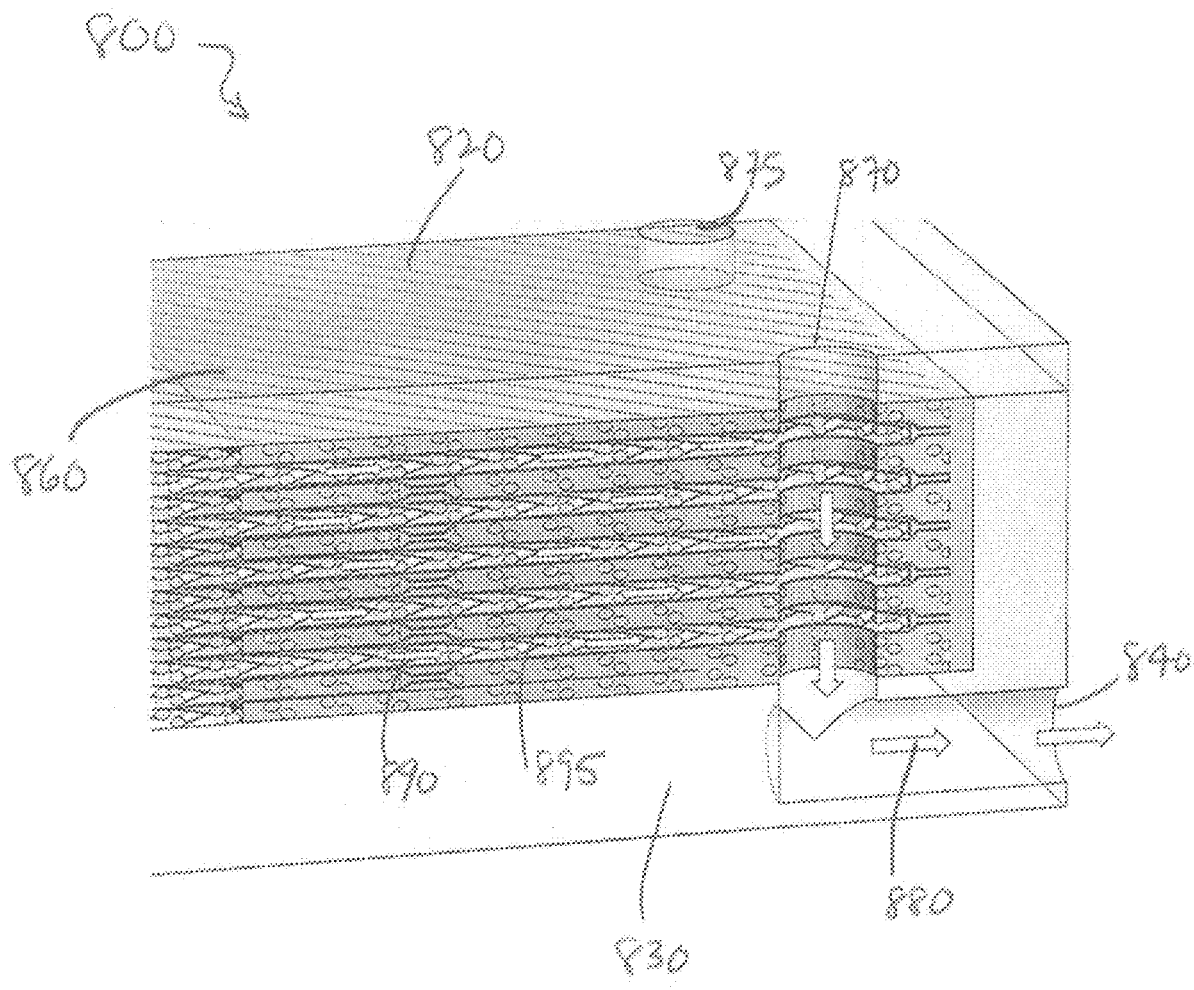
FIG. 12 presents a schematic drawing of a flow pattern from dilute compartments to an outlet port.

FIG. 12 is a section view illustrating the product flowing from the dilute compartments through an internal passage to the dilute outlet port, as shown by product/dilute flow directional arrows 880. The films that are welded to the dilute screens mask the screens and prevent the adhesive from penetrating into dilute compartments 890 at the outlet channel 870. The adjacent screens of concentrate compartments 895 are not protected by the films and are filled with adhesive to form potted spacer screen portions. Therefore, there is no fluid communication between concentrate compartments 895 and dilute channel 870. A section view through the concentrate outlet port 875 would illustrate the reject stream flowing through concentrate compartments 895 that are masked along the path of the concentrate outlet port 875.

While the directional flow arrows shown in FIG. 12 indicate a flow toward an outlet, flow in the opposite direction would indicate feed water flowing from an inlet port to the dilute compartments. Likewise, while FIG. 12 shows the dilute flow, a depiction of the concentrate flow would be analogous. A separate feed water with an ionic content different than the feed water to the dilute compartments may be supplied to the concentrate compartments in a similar manner.

The inlets and outlets formed through the above-described process may be incorporated into an electrochemical treatment device.

Figure 13A:
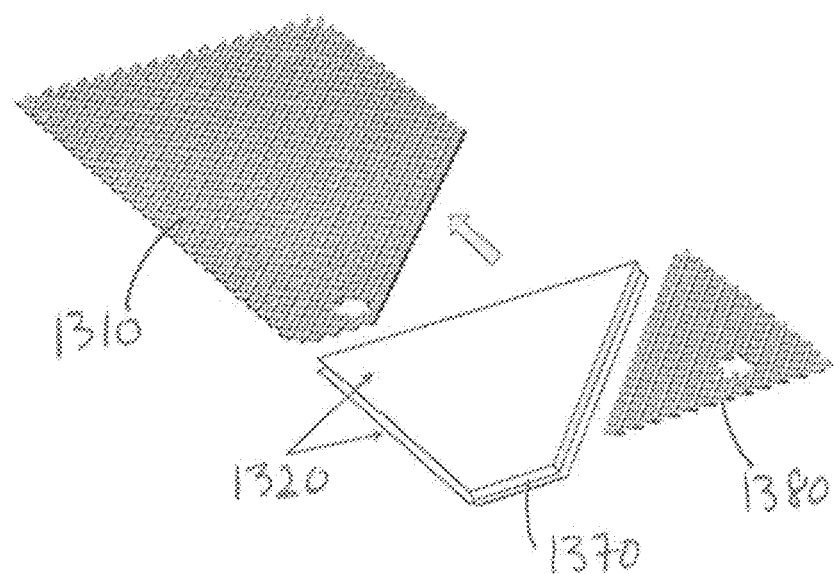
FIGS. 13a and 13b present an exploded and a schematic drawing of a masked spacer screen in accordance with one or more embodiments.
Figure 13B:
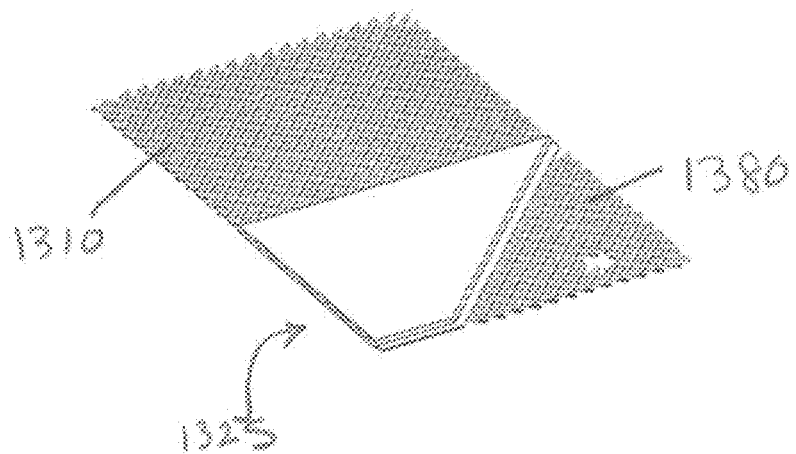

According to one or more alternative embodiments, the films may not be welded directly to the screens that define the flow compartments. Instead, as shown in FIG. 13a, films 1320 are pre-welded to each other and form a sleeve 1325 with a seam 1370. The end portion of each spacer screen 1310 is trimmed to allow sleeve 1325 to be placed over the end portion. As shown, the triangular shaped remainder portion 1380 of spacer screen 1310 may be positioned in place, for example, as shown in FIG. 13b, using locating pins, or any other means. This alternative approach may offer certain advantages because the welding of plastic films 1320 is generally easier and faster than welding in situ with a spacer screen between the films. This alternative approach allows the fabrication of sleeve 1325 to be automated.

Figure 14:
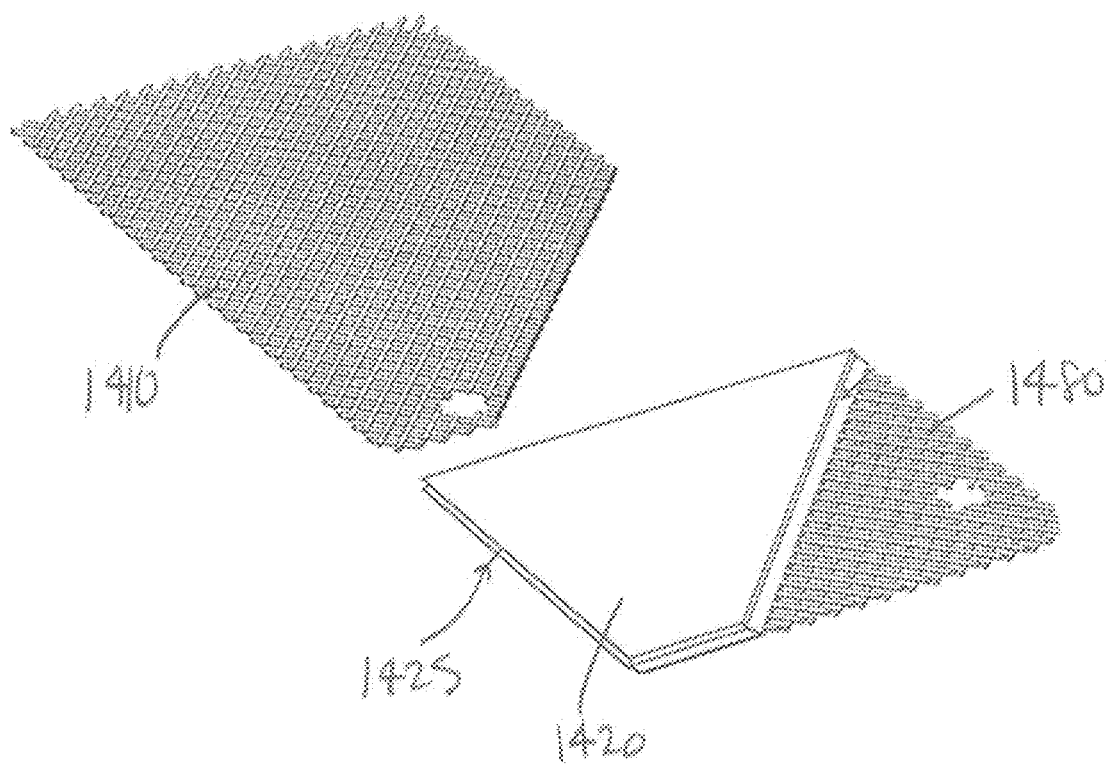
FIG. 14 presents a schematic drawing of a masked spacer screen in accordance with one or more embodiments.

In yet another embodiment, as shown in FIG. 14, films 1420 may be welded to each other to form sleeves 1425. In this embodiment, the edge of a triangular piece 1480 of the screen spacer 1410 may be inserted into one of the seams 1470 in each sleeve 1425 and bonded together with films 1420. In contrast to the embodiment shown in FIGS. 13a and 13b, this method eliminates a step of positioning smaller portions of screens and may simplify the assembly of the stack of cell pairs. This embodiment of sleeve fabrication may be automated with the welding parameters adjusted for the inclusion of screen material in the welds.

Figure 15:
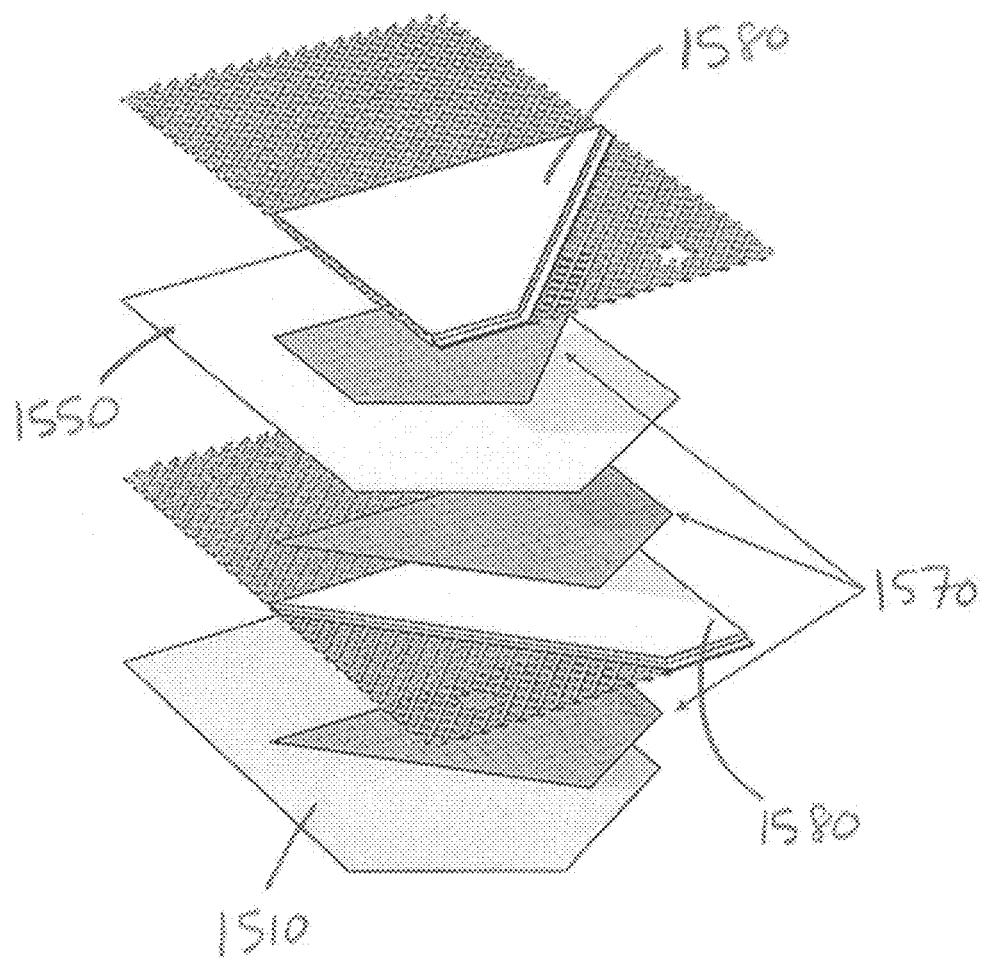
FIG. 15 presents an exploded view schematic drawing of a cell pair in accordance with one or more embodiments.

In yet another embodiment, as shown in FIG. 15, a porous material 1570 may be positioned between each sleeve 1580 and adjacent membranes, cation exchange membrane 1510 or anion exchange membrane 1550. This arrangement may avoid potential gap formation. During the potting step, if the adhesive does not penetrate between the membranes and the films then gaps may form under operating fluid pressure. Any gap may result in cross-leaks between the two streams. The porous material 1570 may assist to create spaces between the films and the membranes into which the adhesive may flow or migrate through capillary action prior to curing.

Potential porous materials include thin woven or extruded screens with tight spacing between strands, and porous films produced as substrates for reverse osmosis or ultrafiltration membranes. The materials can be selected based on potting trials with different adhesives. For example, one such material is a woven monofilament polyester screen with 280 strands/inch (110 strands/cm) and an overall thickness of 0.0024 inch (60 μm).

Potential materials for the potting adhesives include, without limitation, epoxies and urethanes. Potential materials for the masking films include, without limitation, PVC and polyester films. The films may have a matte surface finish that may aid in bonding with the potting materials.

According to one or more embodiments, methods for potting are incorporated into an inlet system designed to create two distinct inlet flows from separate inlet feed sources. One stream may pass to the dilute compartments and another stream may pass to the concentrate compartments. To isolate the dilute compartments from the concentrate compartments, the initial end of the bundle of cell pairs is potted into, for example, epoxy adhesive, which is then allowed to fully cure. Portions of the screen connected to the different compartments are targeted and isolated from the epoxy adhesive potting material, and may remain open to flow of fluid from a manifold. Portions of the spacer screen may be slipped into a pocket of a welded plastic film, or a plastic film will be welded onto it, thereby forming a masked portion of the spacer screen separate from a potted portion encapsulated in epoxy.

Figure 16A:
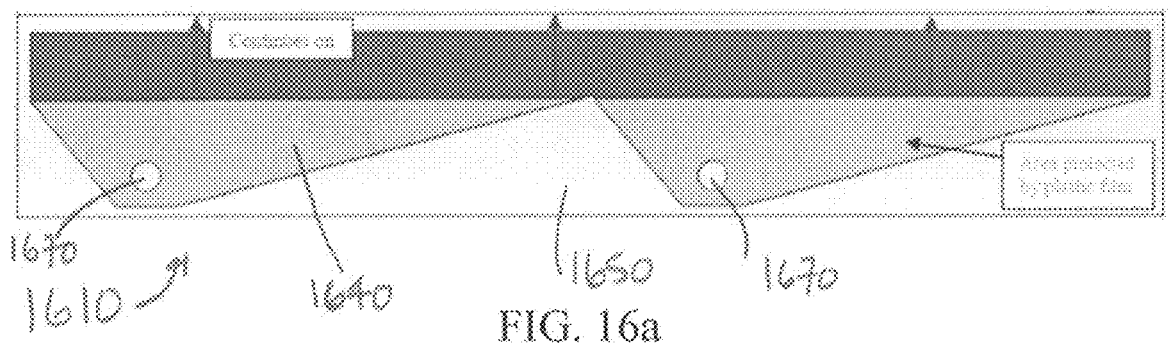
FIGS. 16a, 16b, and 16c present schematic drawings of an ion exchange membrane and compartment spacers in accordance with one or more embodiments.
Figure 16B:
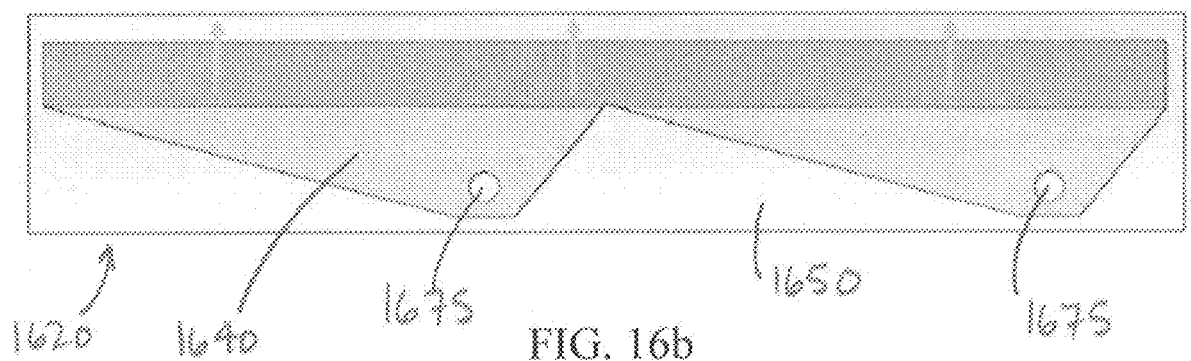
Figure 16C:
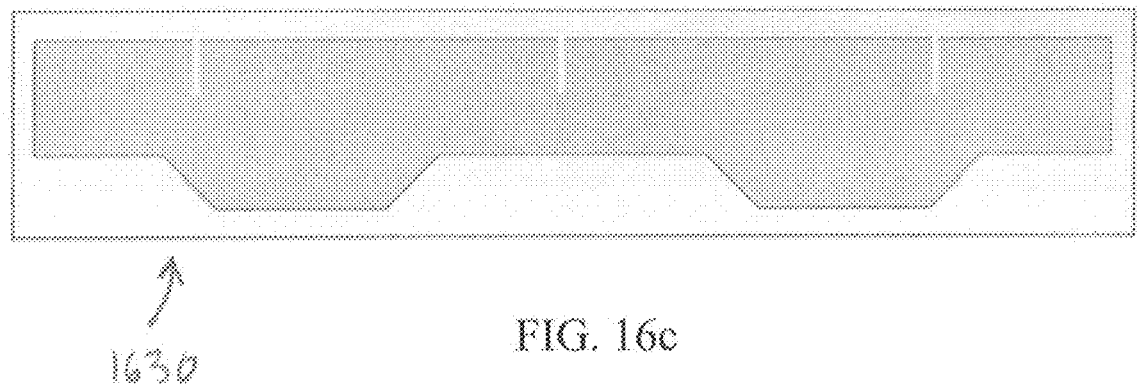
Figure 17:
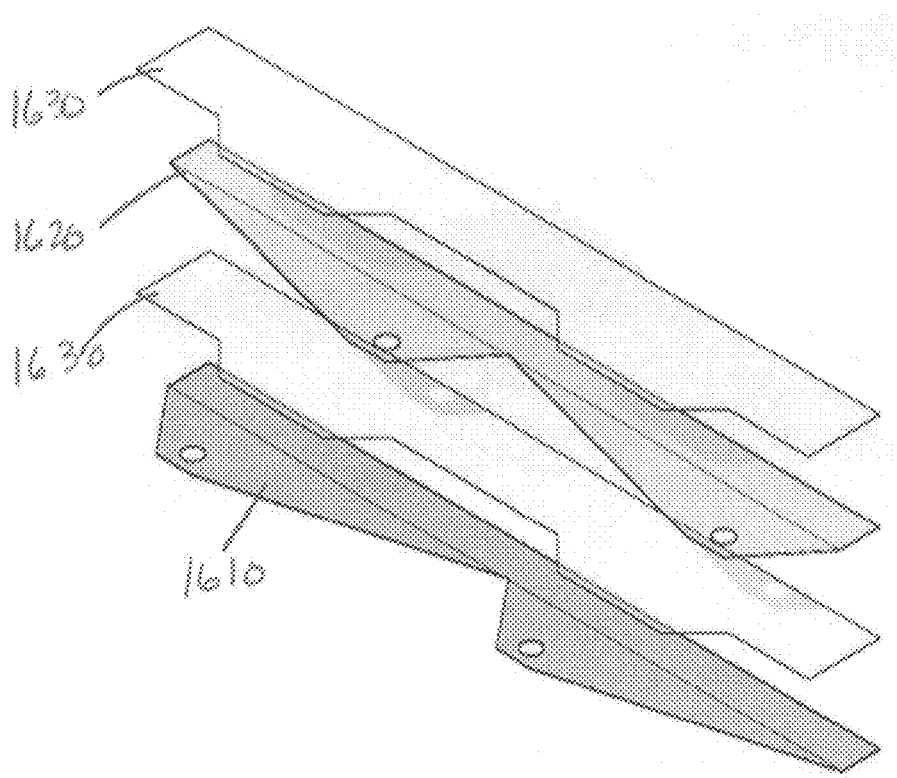
FIG. 17 presents an exploded view schematic drawing of cell pair components in accordance with one or more embodiments.
Figure 18:
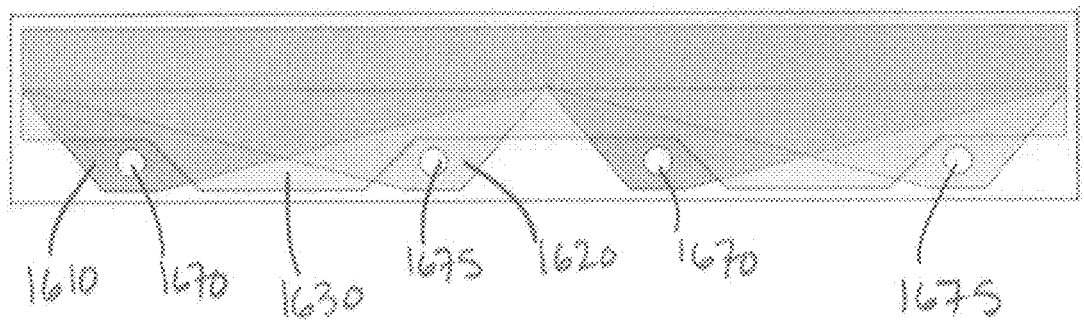
FIG. 18 presents a schematic drawing of assembled cell pair components in accordance with one or more embodiments.

FIGS. 16-18 show an example of how the spacer screens may be cut, according to one or more embodiments. FIGS. 16a, 16b, and 16c are schematic drawings of an example of the shape of portions of ion exchange membrane and compartment spacers. As assembled, the membranes and spacer screens may not interfere with channels that may be created in the epoxy potting material. In FIG. 16a, a dilute compartment spacer 1610 has masked portion 1640 isolated from epoxy by a plastic film. Dilute channels 1670 are formed in spacer screen 1610 to communicate flow. A portion of spacer screen 1610 may be removed and subsequently filled with epoxy potting material as a potted portion 1650 of the dilute compartment. In FIG. 16b, a concentrate compartment spacer screen 1620 has masked portion 1640 isolated from epoxy potting material by a plastic film. Concentrate channels 1675 are formed in spacer screen 1620 to communicate flow. A portion of spacer screen 1620 may be removed and subsequently filled with epoxy as a potted portion 1650 of the concentrate compartment. In FIG. 16c an ion exchange membrane 1630 is shown that may be shaped and placed between the spacer screens. In this embodiment the cation exchange membrane and anion exchange membrane may have similar shapes.

The exploded view of FIG. 17 illustrates the cell pair components may be layered on each other. FIG. 18 shows the assembly of the cell pair of this embodiment. In this example, four channels are created, two channels 1670 for the dilute compartments and two channels 1675 for the concentrate compartments. Additional channels could be created as desired, and/or depending on the length of the module and the expected flow.

Figure 19:
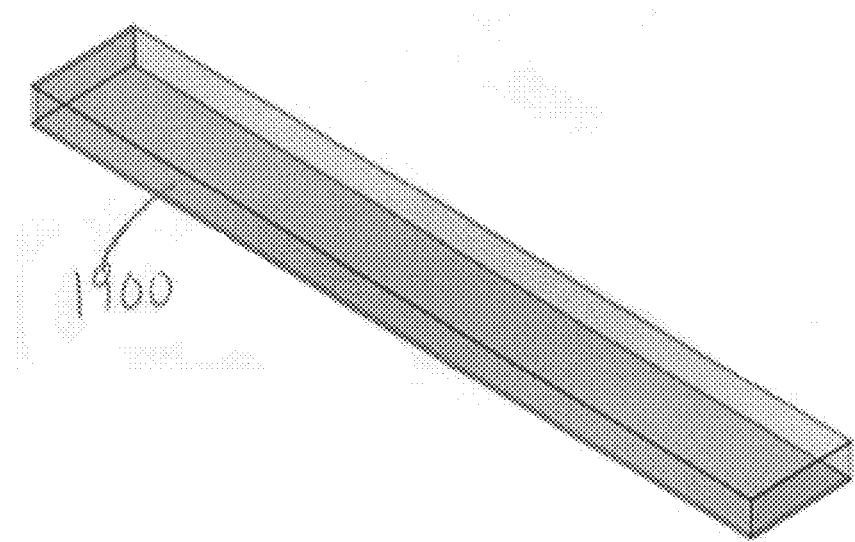
FIG. 19 presents a schematic drawing of an epoxy potting vessel in accordance with one or more embodiments.
Figure 20:
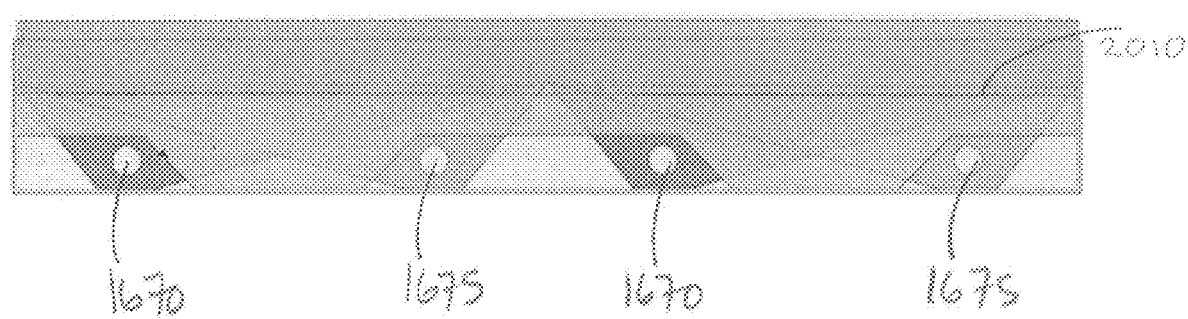
FIG. 20 presents a schematic drawing of a potted bundle in accordance with one or more embodiments.

FIG. 19 illustrates an embodiment of a potting vessel 1900 in which an end portion of the bundle of cell pairs may be inserted, fixed, and then potted. FIG. 20 shows the end portion of a bundle of cell pairs positioned inside the potting vessel. Also included is the approximate height to which the epoxy potting material will be injected and allowed to cure. The height of the epoxy line 2010 may fall below the edge of the protective plastic film to prevent the epoxy from flowing over and blocking the screen spacer. After the epoxy has cured, port holes may be formed through the holder, epoxy, and bundle to form channels 1670 and 1675 that allow flow to the separated dilute and concentrate compartments.

Figure 21:
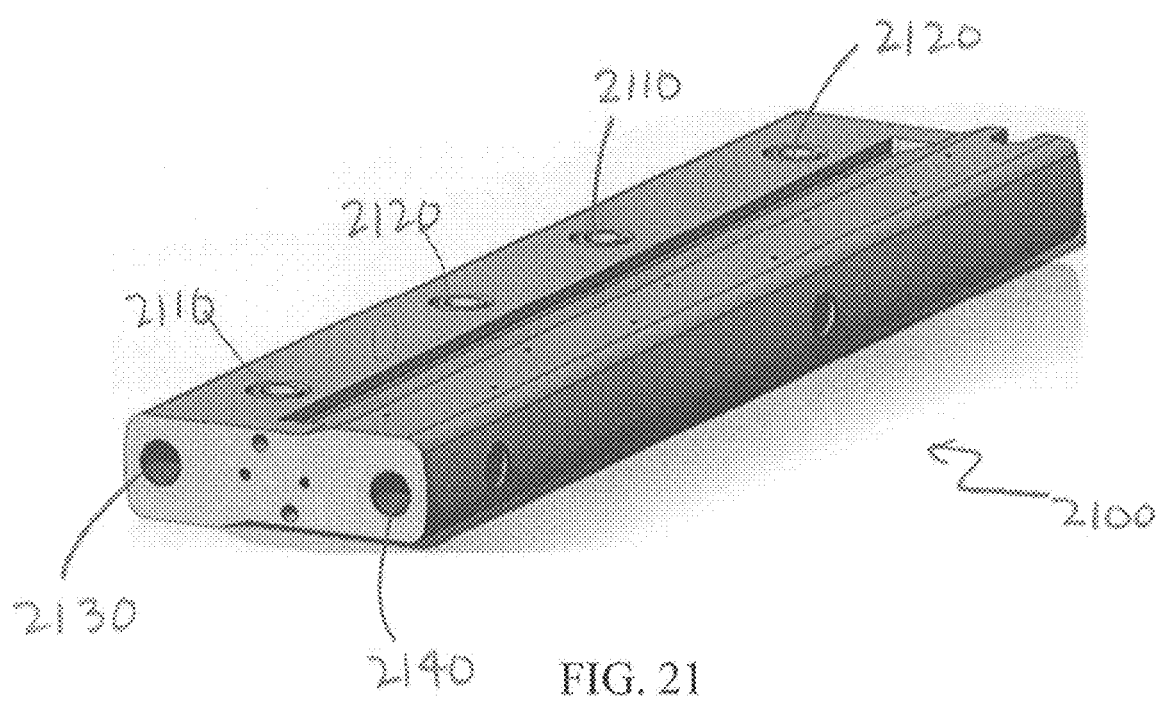
FIG. 21 presents a schematic drawing of a central hub for an electrochemical treatment device having wound cell pairs in accordance with one or more embodiments.

An example of a central hub 2100 is shown in FIG. 21. The bundle of cell pairs may be mounted to and wound about central hub 2100. The central hub 2100 includes two dilute ports 2110 and two concentrate ports 2120 are shown on the top portion of hub 2100. Two dilute ports and two concentrate ports are also on bottom of hub (not shown). In operation, the dilute ports 2110 may be in fluid communication with the dilute stream channel and a source of dilute feed via dilute feed inlet 2130. In operation, the concentrate ports 2120 may be in fluid communication with the concentrate stream channel and a source of concentrate feed via concentrate feed inlet 2140. In this manner, the dilute feed stream and the concentrate feed stream may be different streams.

Figure 22:
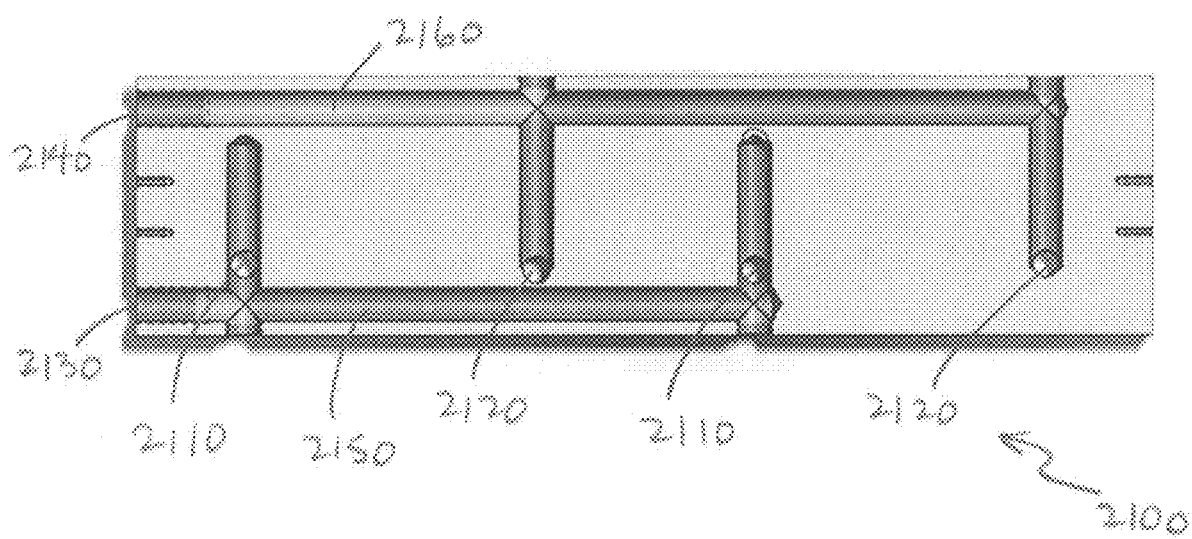
FIG. 22 presents a cross-section schematic drawing of a central hub for an electrochemical treatment device having wound cell pairs in accordance with one or more embodiments.
Figure 23:
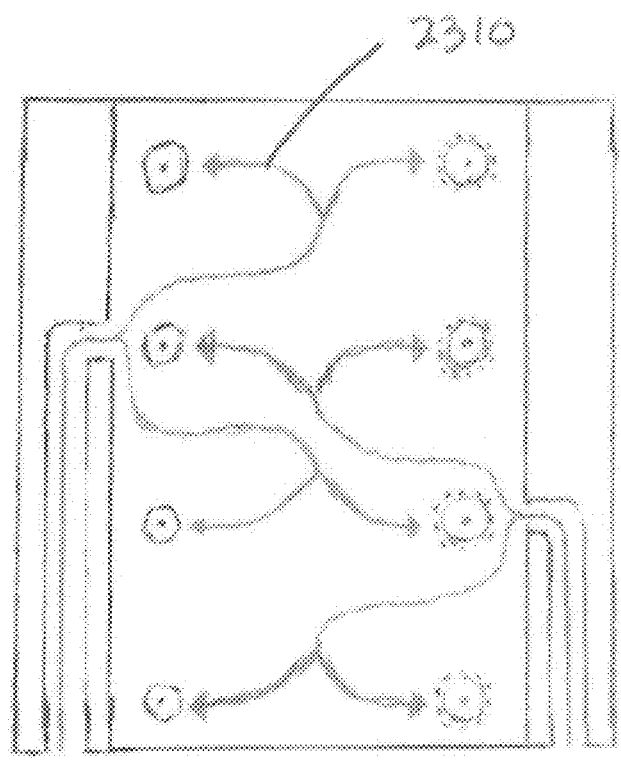
FIG. 23 presents a schematic drawing of various flow patterns within a central hub in accordance with one or more embodiments.
Figure 24:
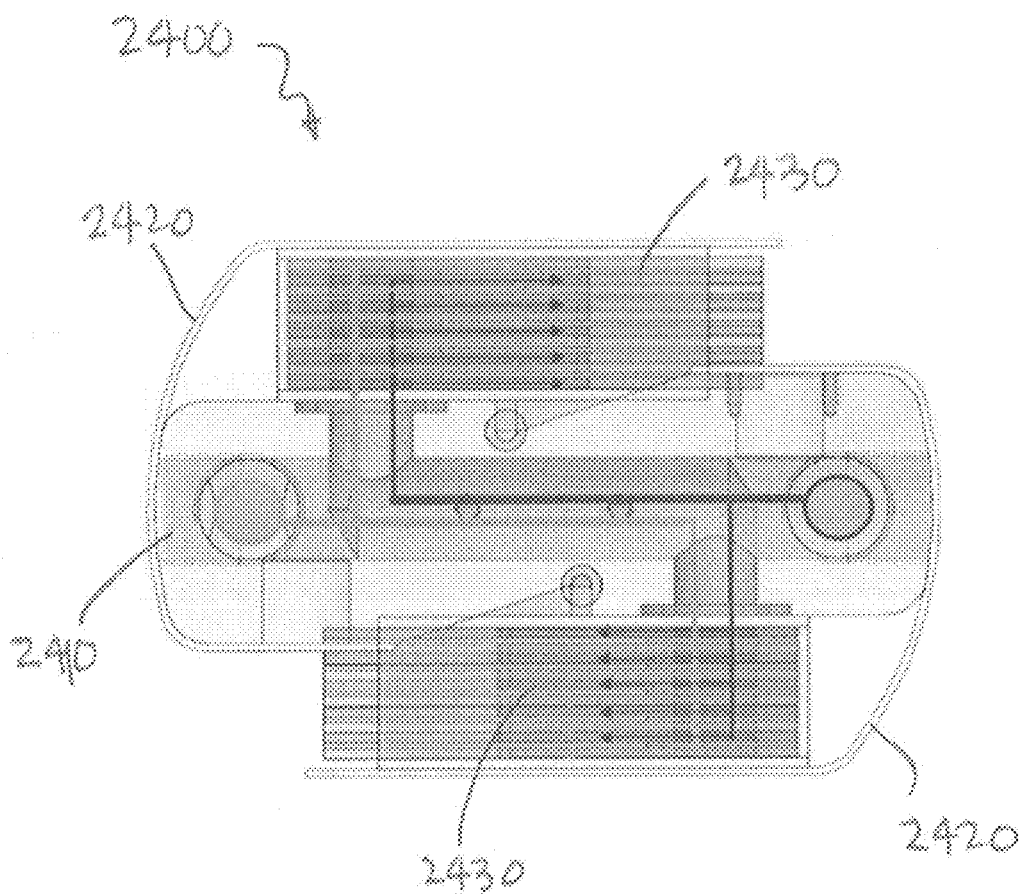
FIG. 24 presents a schematic drawing of various flow patterns within a central hub in accordance with one or more embodiments.

FIG. 22 shows a cross section of the example central hub 2100 shown in FIG. 21. Internal dilute conduit 2150 and concentrate conduit 2160 of central hub 2100 establish communication from dilute feed inlet 2130 and concentrate feed inlet 2140 to dilute ports 2110 and concentrate ports 2120, respectively. Conduits 2150 and 2160 are illustrated as substantially straight for machinability. However, as shown in FIG. 23, other possible channel geometries promote flow between the ports. The curved channels 2310, for example, may be formed with molded parts. FIG. 24 shows an example of a portion of an assembled device 2400. The device includes central hub 2410, bundle 2430, and segmented anodes 2420. The dilute flow stream feeds into the dilute compartments of both sets of cell pairs of the bundle 2430, as does the concentrate flow stream.

The function and advantages of these and other embodiments will be more fully understood from the following example. The example is intended to be illustrative in nature and is not to be considered as limiting the scope of the embodiments discussed herein.

Example 1

An electrodialysis device having a racetrack configuration was evaluated for efficiency in reducing TDS, flow rate, process efficiency, energy consumption, and overall recovery.

The device comprised two sets of 15 cell pairs wound around an anode, formed from titanium coated with IOA-LC to form a bundle having a racetrack configuration including a total of 30 cell pairs. The bundle was surrounded by a 316 stainless steel cathode. The cation exchange membranes and the anion exchange membranes used in the bundles were those described in U.S. Pat. Nos. 8,703,831 and 9,023,902. The 60 membranes used in the 30 cell pairs had an average length of 3417 mm and an initial width of 300 mm. The average width of the membranes, after potting, was 250 mm. The total membrane area was therefore 51.2 $m^2$.

A common feed stream was fed to dilute and concentrate compartments of the two sets of 15 cell pairs. Eight different feed streams, as summarized in Table 1, were evaluated. The streams 1-4 had TDS in the range of brackish water, while the streams 5-8 had TDS approaching brine or seawater.

TABLE 1

Feed stream concentration.

| Run Number | Temperature (° C.) | Conductivity (mS/cm) | Feed concentration (mol/l) | Feed concentration (ppm) |
|---|---|---|---|---|
| 1 | 25.1 | 7.780 | 0.0714 | 4168 |
| 2 | 26.7 | 7.546 | 0.0691 | 4035 |
| 3 | 28.4 | 7.65 | 0.0701 | 4092 |
| 4 | 29.9 | 7.56 | 0.0693 | 4042 |
| 5 | 28.5 | 51.30 | 0.5565 | 31855 |
| 6 | 29.8 | 51.06 | 0.5534 | 31685 |
| 7 | 30.2 | 51.18 | 0.5549 | 31770 |
| 8 | 30.4 | 52.11 | 0.5667 | 32429 |

The product streams recovered from the two sets of 15 cell pairs are summarized in Table 2. After one pass through the device in each bundle set of 15 cell pairs the TDS was reduced over 20% on average in streams 5-8.

TABLE 2

Product stream concentration and flow rate.

| | Bundle set 1 dilute | | | | | Bundle set 2 dilute | | | |
|---|---|---|---|---|---|---|---|---|---|
| Run | Temp. (° C.) | Cond. (mS/cm) | Conc. (ppm) | Flow rate (ml/min) | Run | Temp. (° C.) | Cond. (mS/cm) | Conc. (ppm) | Flow rate (ml/min) |
| 1 | 24.5 | 6.947 | 3699 | 3092 | 1 | 24.7 | 6.860 | 3650 | 3079 |
| 2 | 26.3 | 6.036 | 3190 | 3112 | 2 | 26.4 | 5.745 | 3029 | 3108 |
| 3 | 28.0 | 4.95 | 2593 | 3112 | 3 | 28.1 | 5.08 | 2663 | 3108 |
| 4 | 29.5 | 4.15 | 2151 | 3112 | 4 | 29.8 | 4.35 | 2260 | 3108 |
| 5 | 28.0 | 42.16 | 25427 | 2964 | 5 | 28.4 | 41.12 | 24705 | 3011 |
| 6 | 29.6 | 41.35 | 24864 | 2421 | 6 | 29.7 | 41.46 | 24941 | 2424 |
| 7 | 29.9 | 40.91 | 24560 | 1810 | 7 | 30.1 | 41.66 | 25079 | 1838 |
| 8 | 30.5 | 41.72 | 25121 | 1169 | 8 | 30.5 | 42.27 | 25503 | 1232 |

The reject streams recovered from the concentrate compartments of the two sets of 15 cell pairs are summarized in Table 3. Only streams 1-4 were evaluated. These concentrate streams indicate increased conductivity, concentration, and corresponding reduced flow rates. Similar results are expected in ED devices with common feed streams fed to dilute and concentrate compartments. Other embodiments described above enable different feed streams to be fed to dilute and concentrate compartments. This feature may add process efficiency by limiting water waste and enabling staging and fluid connection of a plurality of such devices.

TABLE 3

Reject stream concentration and flow rate.

| | Bundle set 1 concentrate | | | | | Bundle set 2 concentrate | | | |
|---|---|---|---|---|---|---|---|---|---|
| Run | Temp. (° C.) | Cond. (mS/cm) | Conc. (ppm) | Flow rate (ml/min) | Run | Temp. (° C.) | Cond. (mS/cm) | Conc. (ppm) | Flow rate (ml/min) |
| 1 | 25.1 | 9.785 | 5314 | 1215 | 1 | 25.0 | 9.795 | 5320 | 1209 |
| 2 | 26.7 | 11.83 | 6515 | 1224 | 2 | 26.7 | 11.75 | 6467 | 1219 |
| 3 | 28.3 | 13.74 | 7663 | 1176 | 3 | 28.4 | 13.73 | 7657 | 1209 |
| 4 | 30.0 | 15.48 | 8723 | 1195 | 4 | 30.2 | 14.85 | 8339 | 1209 |

The total product flow rates, process efficiency, energy consumption, and overall recovery are summarized in Table 4. These results indicate that the ED device having a racetrack configuration of bundled cell pairs can be effective in treatment of high TDS feed streams. The product flow rate through 30 cell pairs (average of 6208 ml/min for streams 1-4) is satisfactory for commercial applications. The average TDS reduction of streams 1-4 is over 28%, which is also satisfactory for one pass through 30 cell pairs. The process efficiencies of the two bundle sets of 15 cell pairs is modest, nearly 70% combined for streams 1-4 and near 60% combined for streams 5-8. This is likely a function of the streams being processed through the device. The energy consumption and overall recovery were also indicative of a device capable of commercial applications. The overall recovery averaged 63.8% for streams 1-4 and 64.5% for streams 5-8.

TABLE 4

Process efficiency and recovery.

| Run | Total product flow rate (ml/min) | Average product conc. (ppm) | Process efficiency, Bundle set 1 (%) | Process efficiency, Bundle set 2 (%) | Energy consumption (kWh/m$^3$) | Overall recovery (%) |
|---|---|---|---|---|---|---|
| 1 | 6171 | 3674 | 71.0 | 78.1 | 0.037 | 63.6 |
| 2 | 6220 | 3110 | 60.2 | 71.6 | 0.146 | 63.6 |
| 3 | 6220 | 2628 | 72.0 | 68.6 | 0.287 | 64.0 |

TABLE 4-continued

Process efficiency and recovery.

| Run | Total product flow rate (ml/min) | Average product conc. (ppm) | Process efficiency, Bundle set 1 (%) | Process efficiency, Bundle set 2 (%) | Energy consumption (kWh/m³) | Overall recovery (%) |
|---|---|---|---|---|---|---|
| 4 | 6220 | 2205 | 68.7 | 64.7 | 0.860 | 63.9 |
| 5 | 5974 | 25063 | 50.0 | 56.4 | 1.357 | 68.0 |
| 6 | 4846 | 24903 | 58.0 | 57.4 | 1.026 | 67.1 |
| 7 | 3648 | 24822 | 62.3 | 58.7 | 0.772 | 63.6 |
| 8 | 2401 | 25317 | 66.8 | 66.8 | 0.490 | 59.2 |

The above results confirm that an ED device having a racetrack configuration may be used to effectively treat feed waters of varying quality to reduce TDS, with satisfactory flow rates, process efficiency, energy consumption, and overall recovery.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrochemical separation device, comprising:
   a first electrode;
   a plurality of cell pairs wound around the first electrode to form a bundle;
     each of the plurality of cell pairs comprising an ion concentrating compartment and an adjacent ion diluting compartment;
     the ion concentrating compartment comprising a first spacer having a masked portion and a potted portion;
     the adjacent ion diluting compartment comprising a second spacer having a masked portion and a potted portion;
     the masked and potted portions of the first and second spacers being in an alternating alignment;
   a concentrate stream channel extending through the masked portion of first spacer and the potted portion of the second spacer, the concentrate stream channel being in fluid communication with the ion concentrating compartment and in fluid isolation from the ion diluting compartment;
   a dilute stream channel extending through the potted portion of the first spacer and the masked portion of the second spacer, the dilute stream channel being in fluid isolation from the ion concentrating compartment and in fluid communication with the ion diluting compartment; and
   a second electrode surrounding the bundle.

2. The device of claim 1, further comprising a manifold block proximate to the bundle, the manifold block comprising a dilute stream port in fluid communication with the dilute stream channel.

3. The device of claim 2, wherein the manifold block further comprises a concentrate stream port in fluid communication with the concentrate stream channel.

4. The device of claim 3, wherein the dilute stream port is in fluid communication with a dilute feed source.

5. The device of claim 4, wherein the concentrate stream port is in fluid communication with a concentrate feed source.

6. The device of claim 5, wherein the dilute feed source is different from the concentrate feed source.

7. The device of claim 1, wherein the bundle has a racetrack configuration.

8. The device of claim 7, wherein the first electrode comprises a straight section with a semi-circular section at each end to define a substantially elongated S-shaped anode.

9. The device of claim 7, wherein a cross-section of the bundle has a substantially straight section and a curved section at first and second ends of the substantially straight section.

10. The device of claim 1, wherein each of the masked portions comprises a sleeve surrounding a portion of the spacer.

11. The device of claim 10, wherein the sleeve comprises a pair of impermeable films joined at a seam.

12. The device of claim 1, wherein each of the masked portions comprises a pair of impermeable films welded to the spacer.

13. The device of claim 1, further comprising a central hub, the central hub comprising a dilute port in fluid communication with the dilute stream channel and a source of dilute feed.

14. The device of claim 13, wherein the central hub further comprises a concentrate port in fluid communication with the concentrate stream channel and a source of concentrate feed.

15. The device of claim 14, wherein the source of dilute feed and the source of concentrate feed are different.

16. The device of claim 1, wherein the bundle comprises more than 20 cell pairs.

17. The device of claim 1, wherein the bundle comprises more than 50 cell pairs.

18. The device of claim 9, wherein a ratio of a length of the substantially straight section to a radius of each of the curved sections is greater than zero.

19. The device of claim 15, wherein the radius of curvature of the curved sections is not dependent on the number of cell pairs.

20. The device of claim 15, wherein the electrochemical treatment device comprises an electrodialysis treatment device.

* * * * *